(12) United States Patent
Li et al.

(10) Patent No.: US 11,348,262 B1
(45) Date of Patent: *May 31, 2022

(54) THREE-DIMENSIONAL IMAGING WITH SPATIAL AND TEMPORAL CODING FOR DEPTH CAMERA ASSEMBLY

(71) Applicant: Facebook Technologies, LLC, Menlo Park, CA (US)

(72) Inventors: Fengqiang Li, Redmond, WA (US);
Zihe Gao, Redmond, WA (US);
Michael Hall, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,316

(22) Filed: Dec. 16, 2020

Related U.S. Application Data

(63) Continuation of application No. 16/688,969, filed on Nov. 19, 2019, now Pat. No. 10,902,623.

(51) Int. Cl.
*G06T 7/521* (2017.01)
*G06T 7/55* (2017.01)
(Continued)

(52) U.S. Cl.
CPC ............. *G06T 7/521* (2017.01); *G01B 11/22* (2013.01); *G01S 7/4816* (2013.01); *G01S 17/86* (2020.01);
(Continued)

(58) Field of Classification Search
CPC . G06T 7/521; G06T 7/55; G06T 2207/10028; G01B 11/22; G01S 7/4816;
(Continued)

(56) References Cited

U.S. PATENT DOCUMENTS

| | | | |
|---|---|---|---|
| 5,016,282 | A | 5/1991 | Tomono et al. |
| 5,564,417 | A | 10/1996 | Chance |

(Continued)

FOREIGN PATENT DOCUMENTS

WO   WO 2013/066634 A1   5/2013

OTHER PUBLICATIONS

Kadambi, A. et al., "Polarized 3D: High-Quality Depth Sensing with Polarization Cues," The IEEE International Conference on Computer Vision (ICCV), 2015, pp. 3370-3378.

(Continued)

*Primary Examiner* — Michael E Teitelbaum
(74) *Attorney, Agent, or Firm* — Fenwick & West LLP

(57) ABSTRACT

A camera assembly for depth sensing of a local area. The camera assembly includes a projector, a sensor and a controller. The projector emits, into the local area, a structured light (SL) pattern at multiple phases. The sensor images the local area using multiple augmented pixels. Each augmented pixel has multiple gates and at least some of the gates have a respective local storage location. Each capture phase of the augmented pixel is divided into a respective plurality of time bins associated with a respective subset of the gates. Each local storage location of the subset of gates stores image data during a respective time bin, the image data based on portions of the SL pattern emitted at a respective phase and reflected from the local area. The controller determines depth information for the local area based on the image data stored during at least one capture phase.

20 Claims, 9 Drawing Sheets

(51) Int. Cl.
  *G01S 7/481* (2006.01)
  *G01S 17/89* (2020.01)
  *G01B 11/22* (2006.01)
  *H04N 5/369* (2011.01)
  *H04N 5/3745* (2011.01)
  *G01S 17/86* (2020.01)

(52) U.S. Cl.
  CPC .............. *G01S 17/89* (2013.01); *G06T 7/55* (2017.01); *H04N 5/36965* (2018.08); *H04N 5/37452* (2013.01); *G06T 2207/10028* (2013.01)

(58) Field of Classification Search
  CPC ..... G01S 17/86; G01S 17/89; H04N 5/36965; H04N 5/37452
  See application file for complete search history.

(56) References Cited

U.S. PATENT DOCUMENTS

| | | |
|---|---|---|
| 8,311,286 B2 | 11/2012 | Masuda et al. |
| 8,569,671 B2 | 10/2013 | Meynants et al. |
| 8,824,779 B1 | 9/2014 | Smyth |
| 9,127,942 B1 | 9/2015 | Haskin et al. |
| 9,555,589 B1 | 1/2017 | Ambur et al. |
| 9,581,744 B1 | 2/2017 | Yun et al. |
| 9,581,827 B1 | 2/2017 | Wong et al. |
| 9,737,209 B2 | 8/2017 | Gramatikov et al. |
| 9,829,710 B1 | 11/2017 | Newell et al. |
| 9,835,777 B2 | 12/2017 | Ouderkirk et al. |
| 10,108,261 B1 | 10/2018 | Hall et al. |
| 10,146,055 B2 | 12/2018 | Ouderkirk |
| 10,229,943 B2 | 3/2019 | Genov et al. |
| 10,902,623 B1 | 1/2021 | Li et al. |
| 2006/0239558 A1 | 10/2006 | Rafii et al. |
| 2007/0058038 A1 | 3/2007 | David et al. |
| 2007/0091175 A1 | 4/2007 | Iddan et al. |
| 2007/0146682 A1 | 6/2007 | Tachino et al. |
| 2009/0021621 A1 | 1/2009 | Hashimoto et al. |
| 2009/0135263 A1 | 5/2009 | Sorek et al. |
| 2010/0188491 A1 | 7/2010 | Shizukuishi |
| 2011/0050885 A1 | 3/2011 | McEldowney |
| 2011/0090385 A1 | 4/2011 | Aoyama et al. |
| 2011/0134298 A1 | 6/2011 | Aoyama |
| 2012/0075432 A1 | 3/2012 | Bilbrey et al. |
| 2012/0082346 A1 | 4/2012 | Katz et al. |
| 2012/0154467 A1 | 6/2012 | Hwang et al. |
| 2012/0274744 A1 | 11/2012 | Wan et al. |
| 2012/0314124 A1 | 12/2012 | Kaizu et al. |
| 2012/0320219 A1 | 12/2012 | David et al. |
| 2013/0135486 A1 | 5/2013 | Wan |
| 2013/0181119 A1 | 7/2013 | Bikumandla et al. |
| 2014/0118397 A1 | 5/2014 | Lee et al. |
| 2014/0285429 A1 | 9/2014 | Simmons |
| 2015/0193920 A1 | 7/2015 | Knee et al. |
| 2016/0065866 A1 | 3/2016 | Hsu |
| 2016/0086379 A1 | 3/2016 | Sadi et al. |
| 2016/0127715 A1 | 5/2016 | Shotton et al. |
| 2016/0147408 A1 | 5/2016 | Bevis et al. |
| 2016/0202484 A1 | 7/2016 | Ouderkirk |
| 2016/0225154 A1 | 8/2016 | Zhou et al. |
| 2016/0324580 A1 | 11/2016 | Esterberg |
| 2016/0334508 A1 | 11/2016 | Hall et al. |
| 2016/0344965 A1 | 11/2016 | Grauer et al. |
| 2016/0373672 A1 | 12/2016 | Liu |
| 2017/0065240 A1 | 3/2017 | Zou et al. |
| 2017/0115393 A1 | 4/2017 | Nagai et al. |
| 2017/0115395 A1 | 4/2017 | Grauer et al. |
| 2017/0180703 A1 | 6/2017 | Kovacovsky et al. |
| 2017/0180713 A1 | 6/2017 | Trail |
| 2017/0192499 A1 | 7/2017 | Trail |
| 2017/0195653 A1 | 7/2017 | Trail et al. |
| 2017/0206660 A1 | 7/2017 | Trail |
| 2017/0276789 A1 | 9/2017 | Ikeno et al. |
| 2017/0323455 A1 | 11/2017 | Bittan et al. |
| 2018/0038944 A1 | 2/2018 | Hellmig et al. |
| 2018/0063390 A1 | 3/2018 | Trail |
| 2018/0063442 A1 | 3/2018 | Mkel et al. |
| 2018/0100731 A1 | 4/2018 | Pau |
| 2018/0102386 A1 | 4/2018 | Kobayashi et al. |
| 2018/0124299 A1 | 5/2018 | Brook |
| 2018/0124372 A1 | 5/2018 | Yang et al. |
| 2018/0135980 A1 | 5/2018 | Nakamura et al. |
| 2018/0143302 A1 | 5/2018 | Osiroff et al. |
| 2018/0196509 A1 | 7/2018 | Trail |
| 2018/0227567 A1 | 8/2018 | Chao et al. |
| 2018/0239146 A1 | 8/2018 | Bierhuizen et al. |
| 2018/0278910 A1 | 9/2018 | Schoenberg et al. |
| 2018/0288343 A1 | 10/2018 | McCarten et al. |
| 2018/0299554 A1 | 10/2018 | Van Dyck et al. |
| 2018/0376090 A1 | 12/2018 | Liu |
| 2019/0033070 A1 | 1/2019 | Murakami |
| 2019/0162852 A1 | 5/2019 | Kim et al. |
| 2019/0181171 A1 | 6/2019 | Tadmor et al. |
| 2019/0342485 A1 | 11/2019 | Lee |
| 2019/0361123 A1 | 11/2019 | Miyazaki |
| 2020/0096640 A1 | 3/2020 | Atanassov et al. |
| 2020/0259989 A1 | 8/2020 | Li et al. |
| 2020/0260021 A1 | 8/2020 | Li et al. |

OTHER PUBLICATIONS

PCT International Search Report and Written Opinion, PCT Application No. PCT/US2018/040771, dated Nov. 16, 2018, 20 pages.
United States Office Action, U.S. Appl. No. 16/219,502, dated Apr. 2, 2020, 22 pages.
United States Office Action, U.S. Appl. No. 16/219,511, dated May 12, 2020, 14 pages.
Yahav, G. et al., "A Low Cost 3D Tracker for Parallax Barrier Display," 2007 3DTV Conference, May 2007, pp. 1-4.
Holloway, J. et al. "Flutter Shutter Video Camera for Compressive Sensing of Videos." 2012 IEEE International Conference on Computational Photography (ICCP), Apr. 28-29, 2012, pp. 1-9.
Raskar, R. et al. "Coded Exposure Photography: Motion Deblurring using Fluttered Shutter." SIGGRAPH '06: ACM SIGGRAPH 2006, Jul. 2006, pp. 795-804.
Non-Final Office Action dated May 27, 2021 for U.S. Appl. No. 16/748,510, filed Jan. 21, 2020, 12 pages.

700

Illuminating a local area with a structured light (SL) pattern at a plurality of phases
710

Image the local area via a sensor, the sensor including a plurality of augmented pixels, each augmented pixel having a plurality of gates and at least some of the gates have a respective local storage location, each of a plurality of capture phases of the augmented pixel is divided into a respective plurality of time bins associated with a respective subset of the gates, each local storage location of the subset of gates stores image data during a respective time bin, the image data based on portions of the SL pattern emitted at a respective phase and reflected from the local area
720

Determine depth information for the local area based on the image data stored during at least one of the capture phases
730

FIG. 7

THREE-DIMENSIONAL IMAGING WITH SPATIAL AND TEMPORAL CODING FOR DEPTH CAMERA ASSEMBLY

CROSS REFERENCE TO RELATED APPLICATIONS

This application is a continuation of co-pending U.S. application Ser. No. 16/688,969, filed Nov. 19, 2019, which is incorporated by reference in its entirety.

TECHNICAL FIELD

The present disclosure generally relates to depth sensing, and specifically relates to three-dimensional imaging with spatial and temporal coding for a depth camera assembly.

BACKGROUND

To achieve compelling user experience in artificial reality systems, it is essential to rely on an accurate and efficient camera for sensing a three-dimensional (3D) surrounding environment. However, it is challenging to design a depth camera having a high performance and low computational power, which is also robust to the environment, flexible to operate, and have a compact form factor.

SUMMARY

A depth camera assembly for depth sensing of a local area is presented herein. The depth camera assembly includes a projector, a sensor and a controller. The projector is configured to emit, into the local area, a structured light (SL) pattern at a plurality of phases. The sensor is configured to image the local area. The sensor includes a plurality of augmented pixels, each augmented pixel having a plurality of gates and at least some of the gates have a respective local storage location. The gates of the augmented pixel capture light signals over a plurality of capture phases. Each capture phase is divided into a respective plurality of time bins associated with a respective subset of the gates. Each local storage location of the subset of gates stores image data during a respective time bin, the image data based on portions of the SL pattern emitted at a respective phase and reflected from the local area. The controller determines depth information for the local area based on the image data stored during at least one of the capture phases.

In some embodiments, a device includes the depth camera assembly. An embodiment of the device may be a headset that integrates the depth camera assembly. The headset further includes a display and an optical assembly. The headset may be part of an artificial reality system. The display is configured to emit image light. The optical assembly is configured to direct the image light to an eye-box of the headset corresponding to a location of a user's eye. The image light may comprise the depth information of one or more objects in the local area determined by the depth camera assembly. The headset may be implemented as an eyeglass-type platform representing a near-eye display. Alternatively, the headset may be implemented as a head-mounted display.

BRIEF DESCRIPTION OF THE DRAWINGS

FIG. 7 is a flow chart illustrating a process of depth sensing based on spatial and temporal imaging, in accordance with one or more embodiments.

Figure 1:
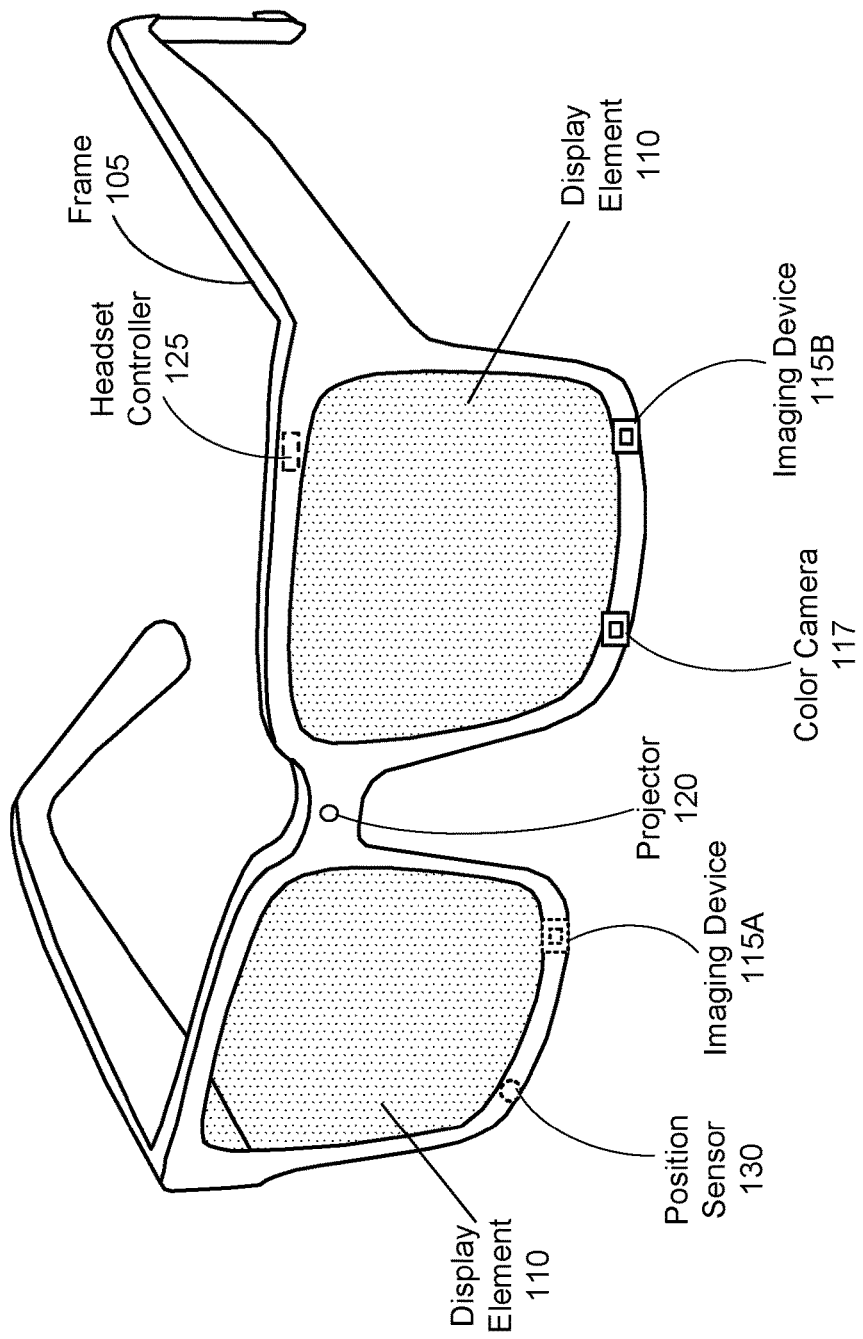
FIG. 1 is a perspective view of a headset implemented as a near-eye-display (NED), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A depth camera assembly (DCA) that uses spatial coding (e.g., structured light (SL) depth information) and/or temporal coding (e.g., time-of-flight (TOF) depth information) for depth sensing is presented herein. Conventional methods for depth sensing typically involve either a triangulation or TOF based depth determination, and have several drawbacks. For example, the triangulation based methods generally have a high computational cost to generate a depth map that involves rectification and searching for corresponding points using a pair of stereo images. The depth resolution achieved with the triangulation-based methods also relies on a baseline (e.g., distance between source and camera), and a size of the baseline increases with increasing depth. The TOF methods for depth sensing experience a limited lateral resolution due to a limited number of pixels in conventional sensors. Also, the TOF methods for depth sensing feature motion blur when capturing moving objects due to a relatively high number of image frames required to estimate the depth. In addition, the quality of determined TOF depth information is limited by the multi-path interference. The DCA presented herein is designed to overcome shortcomings of the triangulation and TOF based depth sensing methods, e.g., by combining SL depth information and TOF depth information.

The DCA includes a projector and a camera with a N-tap sensor, where N refers to a plurality of taps for gates and/or drains of each pixel in the sensor, and N is an integer. For example, the N-tap sensor may include a plurality of pixels, each pixel having nine gates and a drain, i.e., N=10. Each gate has a unique corresponding local storage location. Note that, in some embodiments, the depth sensing using combination of SL based depth determination (e.g., when a SL pattern provides fringe illumination) and TOF based depth determination may require the N-tap sensor with at least six non-drain gates each gate having a unique corresponding local storage location. In such case, three non-drain gates would be used for capturing image data for TOF based depth determination and the remaining three non-drain gates would be used for capturing image data for SL based depth determination. In some other embodiments, the N-tap sensor with more than six non-drain gates can be used (e.g., nine or twelve non-drain gates) or with less than six non-drain gates (e.g., three non-drain gates).

The projector emits a first SL pattern at a first phase into a local area. The camera then images the local area over a range of time that is divided into multiple time bins, e.g., three time bins. The camera collects light during a first time bin in a first gate/local storage location, during a second time bin in a second gate/local storage location, and during the third time bin in a third gate/local storage location. The projector emits a second SL pattern that is phase shifted relative to the first SL pattern, and the camera collects light over three time bins in next three (e.g., four, five and six) gate/local storage locations. Finally, the projector emits a third SL pattern that is phase shifted relative to the first and second SL patterns, and the camera collects light over three time bins in next three (e.g., seven, eight and nine) gate/local storage locations. Data is then read out from all of the local storage locations. The DCA determines depth information for the local area using triangulation (e.g., using images of the SL pattern) and depth information for the local area using collected TOF information. The imaged area can be divided into segments. For each segment, the DCA determines whether the SL based depth information or the TOF based depth information is more accurate, and assigns the more accurate depth information as a depth map to the segment. The DCA generates depth information for the local area as an aggregate depth map of the local area using depth maps assigned for the segments.

In some embodiments, the DCA is part of a device that utilizes a depth map. Example embodiments of the device can be a headset, a smartphone, or some other portable electronic device. The headset that integrates the DCA further includes a display and an optical assembly. The headset may be part of an artificial reality system. The display is configured to emit image light. The optical assembly is configured to direct the image light to an eye-box of the headset corresponding to a location of a user's eye. The image light may comprise the depth information of one or more objects in the local area determined by the DCA. In one embodiment, the headset is implemented as an eyeglass-type platform representing a NED. In another embodiment, the headset is implemented as a AMD.

FIG. 1 is a perspective view of a headset 100 implemented as a NED, in accordance with one or more embodiments. In general, the headset 100 may be worn on the face of a user such that content (e.g., media content) is presented using one or display elements 110 of the headset 100. However, the headset 100 may also be used such that media content is presented to a user in a different manner. Examples of media content presented by the headset 100 include one or more images, video, audio, or some combination thereof. The headset 100 may include, among other components, a frame 105, a display assembly including one or more display elements 110, a DCA, a headset controller 125 and a position sensor 130. While FIG. 1 illustrates the components of the headset 100 in example locations on the headset 100, the components may be located elsewhere on the headset 100, on a peripheral device paired with the headset 100, or some combination thereof.

The headset 100 may correct or enhance the vision of a user, protect the eye of a user, or provide images to a user. The headset 100 may be a NED that produces artificial reality content for the user. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night.

The frame 105 holds the other components of the headset 100. The headset 100 includes a front part that holds the one or more display elements 110 and end pieces to attach to a head of the user. The front part of the frame 105 bridges the top of a nose of the user. The end pieces (e.g., temples) are portions of the frame 105 to which the temples of a user are attached. The length of the end piece may be adjustable (e.g., adjustable temple length) to fit different users. The end piece may also include a portion that curls behind the ear of the user (e.g., temple tip, ear piece).

The one or more display elements 110 provide light to a user wearing the headset 100. As illustrated, the headset 100 includes a display element 110 for each eye of a user. In some embodiments, a display element 110 generates image light that is provided to an eye box of the headset 100. The eye box is a location in space that an eye of user occupies while wearing the headset 100. For example, a display element 110 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye box of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 110 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 110 are at least partially transparent, such that light from the local area may be combined with light from the one or more display elements to produce AR and/or MR content.

In some embodiments, a display element 110 does not generate image light, and instead is a lens that transmits light from the local area to the eye box. For example, one or both of the display elements 110 may be a lens without correction (non-prescription) or a prescription lens (e.g., single vision, bifocal and trifocal, or progressive) to help correct for defects in a user's eyesight. In some embodiments, the display element 110 may be polarized and/or tinted to protect the user's eyes from the sun.

Note that in some embodiments, the display element 110 may include an additional optics block (not shown). The optics block may include one or more optical elements (e.g., lens, Fresnel lens, etc.) that direct light from the display element 110 to the eye box. The optics block may, e.g., correct for aberrations in some or all of the image content, magnify some or all of the image, or some combination thereof.

The DCA determines depth information for at least a portion of a local area surrounding the headset 100. The DCA includes one or more imaging devices 115A, 115B, an optional color camera 117, a projector 120, and a DCA controller (not shown in FIG. 1).

The projector 120 may be configured to illuminate at least a portion of the local area with light (e.g., a SL pattern) in accordance with emission instructions generated by the DCA controller. The projector 120 may be composed of a plurality of emitters, e.g., light emitting diodes (LEDs), vertical-cavity surface-emitting lasers (VCSELs), etc. In some embodiments, the projector 120 is configured to operate as a pulsed phasor light source, i.e., the projector 120 is configured to emit phase-shifted pulses of light. The light emitted by the projector 120 may be a SL pattern (e.g., bar pattern) emitted in the infrared (IR) or some other band. Thus, each pulse of light emitted by the projector 120 may comprise a SL pattern of light.

In addition to the emitters, the projector 120 may further include an optical assembly composed of a plurality of diffractive optical elements (e.g., diffractive gratings) coupled to the emitters. The diffractive optical elements may diffract illumination light generated by the emitters to generate the SL pattern emitted by the projector 120. The SL pattern may be a fringe pattern which can be phase shifted over multiple time instants, which causes the SL pattern to spatially move. An example of the phase shifted SL pattern is a bar pattern caused by interference of light beams emitted by the emitters (e.g., VCSELs) at a same band but shifted in phase relative to each other. The bar pattern may include a series of bars that have a fixed spacing between them. When the projector 120 shifts the phase—it causes the pattern of bars (e.g., vertically oriented) to shift right or left but the spacing between the bars remains constant. The projector 120 can be utilized with various depth sensing techniques, such as SL based depth sensing, TOF based depth sensing, active stereo vision depth sensing, hybrid depth sensing combining SL based depth sensing and TOF based depth sensing, etc. More details about operations of the projector 120 are disclosed in conjunction with FIGS. 4-7.

In some embodiments, the imaging devices 115A, 115B and the color camera 117 of the DCA capture images of the portion of the local area that include the light from the projector 120. Each of the imaging devices 115A, 115B includes one or more cameras configured to capture one or more depth images of at least a portion of the light reflected from one or more objects in the local area. In one embodiment, each imaging device 115A, 115B is configured to capture images in at least a same portion of the IR spectrum as the SL pattern. Additionally, each imaging device 115A, 115B may be also configured to capture images of visible spectrum light. Each imaging device 115A, 115B may include a charge-coupled device (CCD) detector, a complementary metal-oxide-semiconductor (CMOS) detector or some other types of detectors (not shown in FIG. 1) with augmented pixels. Each imaging device 115A, 115B may be configured to operate with a frame rate in the range of approximately 30 Hz to approximately 1 KHz for fast detection of objects in the local area. In some embodiments, each imaging device 115A, 115B is deactivated for a defined amount of time before being activated again. Alternatively or additionally, each imaging device 115A, 115B can operate as instructed by the DCA controller for single or multiple frames, up to a maximum frame rate, which can be in the kilohertz range. The DCA in embodiments not shown could include a single imaging device.

In some embodiments, the DCA includes the color camera 117. The color camera 117 generates color (e.g., RGB) image data. The color camera 117 operates as a passive imaging device. The color camera 117 may capture light from an environment of a local area to generate color image data. Rather than pixel values defining depth or distance from the imaging devices 115A, 115B, pixel values of the color image data may define visible colors of objects captured in the image data. In some embodiments, the color camera 117 includes a controller separate from the DCA controller that generates the color image data based on light captured by the color camera 117. The color camera 117 may provide the color image data to the headset controller 125 for further processing, e.g., combining with depth image data captured by the imaging devices 115A, 115B to obtain colored depth images of the local area.

The DCA controller computes depth information for at least the portion of the local area using the captured images and one or more depth determination techniques. The depth determination technique may be, e.g., direct TOF depth sensing, indirect TOF depth sensing, SL based depth sensing, passive stereo analysis, active stereo analysis (uses texture added to the scene by light from the projector 120), some other technique to determine depth of a scene, or some combination thereof.

The DCA controller may generate the emission instructions and provide the emission instructions to the projector 120 for controlling operation of the projector 120 to emit light. The DCA controller may control, based on the emission instructions, operation of the projector 120 to dynamically adjust a pattern of the light illuminating the local area, an intensity of the light pattern, a density of the light pattern, location of the light being projected at the local area, combination thereof, etc. The DCA controller may be also configured to determine depth information for the one or more objects in the local area based in part on the one or more images captured by the imaging devices 115A, 115B. In some embodiments, the DCA controller provides the determined depth information to a console (not shown in FIG. 1) and/or an appropriate module of the headset 100 (e.g., a varifocal module, not shown in FIG. 1). The console and/or the headset 100 may utilize the depth information to, e.g., generate content for presentation on the display element 110. More details about controlling operation of the projector 120 and determining depth information by the DCA controller are disclosed in conjunction with FIGS. 5-7.

Based on the determined depth information, the DCA controller may determine a pose (i.e., position and orientation) of the headset 100 within the local area. The DCA controller may also generate a model of the local area. The imaging devices 115A, 115B and the color camera 117 may be integrated with the headset 100 or may be positioned within the local area external to the headset 100. In some embodiments, the DCA controller may provide the depth image data and the color image data to the headset controller 125 integrated into the headset 100, e.g. for further processing and/or communication to some other component of an artificial reality system that includes the headset 100. The imaging devices 115A, 115B and the color camera 117 may be part of simultaneous localization and mapping (SLAM) sensors mounted on the headset 100 for capturing visual information of a local area surrounding some or all of the headset 100.

The headset controller 125 may control operations of one or more components of the headset 100 including the projector 120. The headset controller 125 may receive the depth image data and the color image data from the DCA controller and perform additional processing on the depth image data and the color image data. In some embodiments, the headset controller 125 may control operations of components of an audio system integrated into the headset 100 (not shown in FIG. 1). The headset controller 125 may include a communication module (e.g., a transceiver) for data communication (e.g., wireless communication) with some other external component of the artificial reality system, e.g., a server and/or a console (not shown in FIG. 1).

The position sensor 130 generates one or more measurement signals in response to motion of the headset 100. The position sensor 130 may be located on a portion of the frame 105 of the headset 100. The position sensor 130 may include a position sensor, an inertial measurement unit (IMU), or both. Some embodiments of the headset 100 may or may not include the position sensor 130 or may include more than one position sensors 130. In embodiments in which the position sensor 130 includes an IMU, the IMU generates IMU data based on measurement signals from the position sensor 130. Examples of position sensor 130 include: one or more accelerometers, one or more gyroscopes, one or more magnetometers, another suitable type of sensor that detects motion, a type of sensor used for error correction of the IMU, or some combination thereof. The position sensor 130 may be located external to the IMU, internal to the IMU, or some combination thereof.

Based on the one or more measurement signals, the position sensor 130 estimates a current position of the headset 100 relative to an initial position of the headset 100. The estimated position may include a location of the headset 100 and/or an orientation of the headset 100 or the user's head wearing the headset 100, or some combination thereof. The orientation may correspond to a position of each ear relative to a reference point. In some embodiments, the position sensor 130 uses the depth information and/or the absolute positional information from the DCA to estimate the current position of the headset 100. The position sensor 130 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 100 from the sampled data. For example, the IMU integrates the measurement signals received from the accelerometers over time to estimate a velocity vector and integrates the velocity vector over time to determine an estimated position of a reference point on the headset 100. The reference point is a point that may be used to describe the position of the headset 100. While the reference point may generally be defined as a point in space, however, in practice the reference point is defined as a point within the headset 100.

Figure 2:
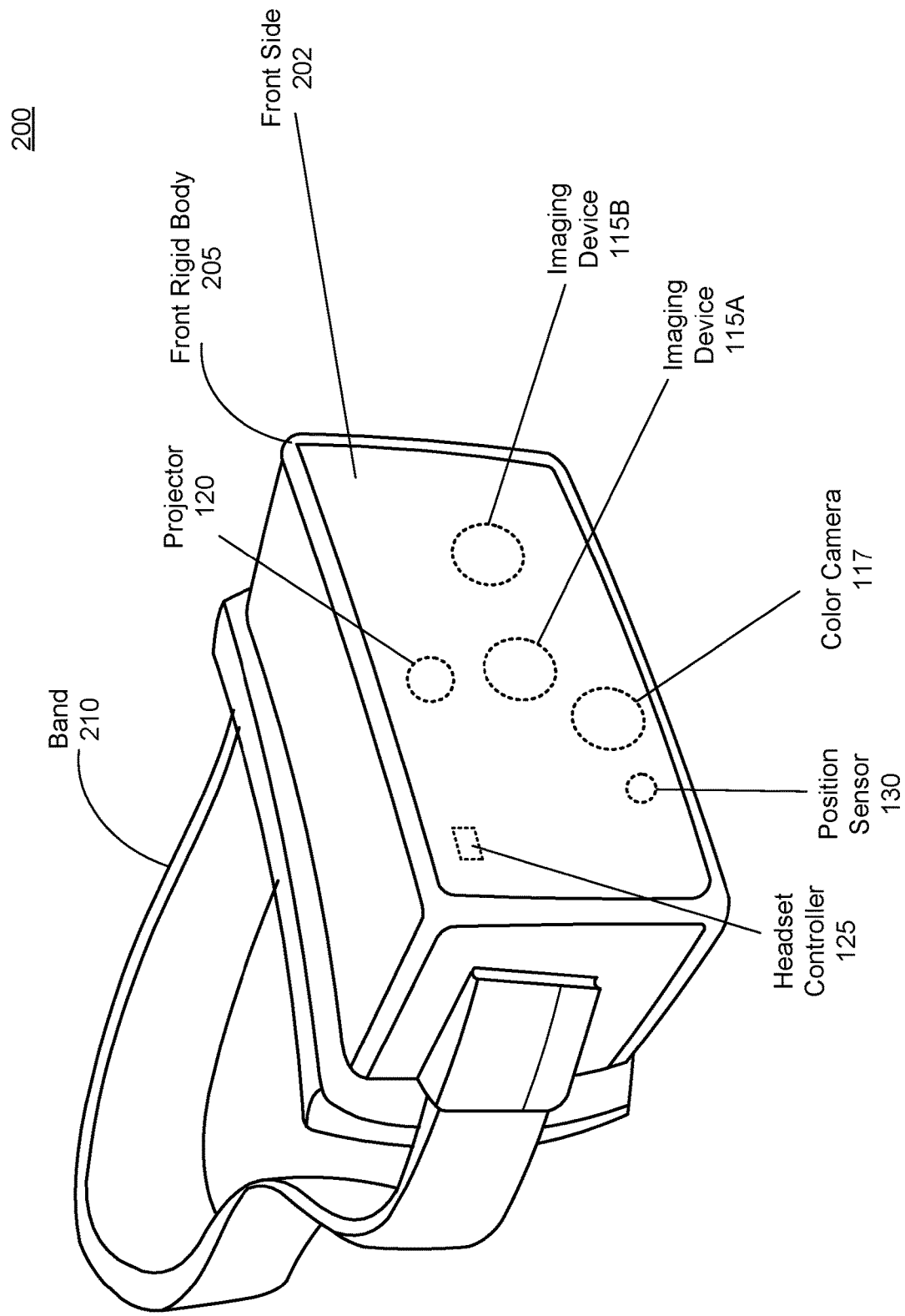
FIG. 2 is a perspective view of a headset implemented as a head-mounted display (HMD), in accordance with one or more embodiments.

FIG. 2 is a perspective view of a headset 200 implemented as a HMD, in accordance with one or more embodiments. In embodiments that describe an AR system and/or a MR system, portions of a front side 202 of the headset 200 are at least partially transparent in the visible band (~380 nm to 750 nm), and portions of the headset 200 that are between the front side 202 and an eye of the user are at least partially transparent (e.g., a partially transparent electronic display). The headset 200 includes a front rigid body 205 and a band 210. The headset 200 includes many of the same components described above with reference to FIG. 1, but modified to integrate with the HMD form factor. For example, the headset 200 includes a display assembly, a DCA, and the position sensors 130. FIG. 2 shows the projector 120, imaging devices 115A, 115B, the color camera 117, the headset controller 125 and the position sensor 130, which operate in the same manner as when they are part of headset 100 of FIG. 1.

In some embodiments, the front rigid body 205 further comprises an eye tracking system (not shown in FIG. 2) that determines eye tracking information for a user's eye. The determined eye tracking information may comprise information about an orientation of the user's eye in an eye box, i.e., information about an angle of an eye-gaze. In one embodiment, the user's eye is illuminated with a SL pattern generated by, e.g., the same type of an illumination source as the projector 120. The eye tracking system can use locations of the reflected SL pattern in a captured image to determine eye position and eye-gaze. In another embodiment, the eye tracking system determines eye position and eye-gaze based on magnitudes of image light captured over a plurality of time instants.

In some embodiments, the front rigid body 205 further comprises a varifocal module (not shown in FIG. 2). The varifocal module may adjust focus of one or more displayed images, based on the eye tracking information. In one embodiment, the varifocal module adjusts focus of the displayed images and mitigates vergence-accommodation conflict by adjusting a focal distance of an optical assembly based on the determined eye tracking information. In another embodiment, the varifocal module adjusts focus of the displayed images by performing foveated rendering of the one or more images based on the determined eye tracking information.

Figure 3A:
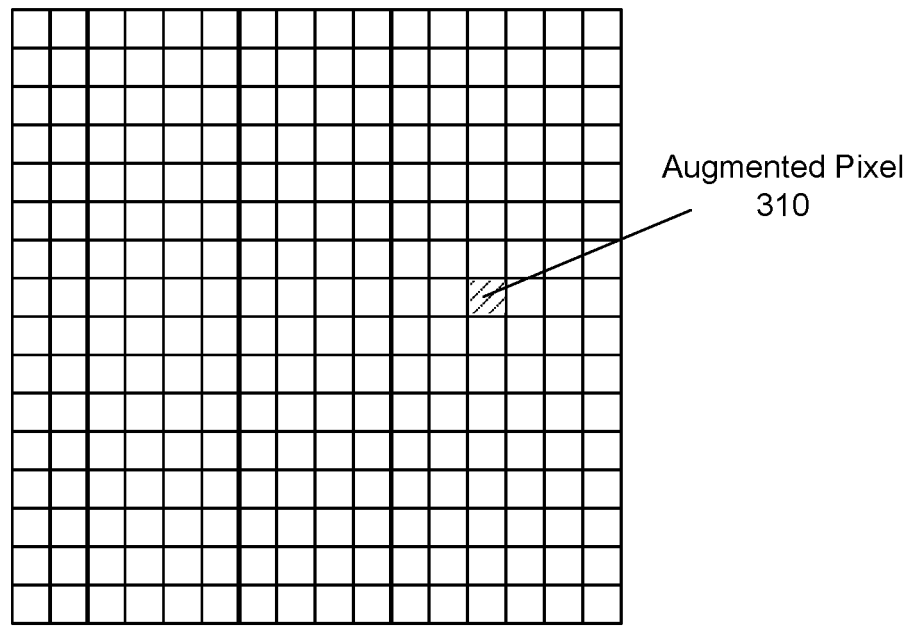
FIG. 3A is an example sensor having a plurality of augmented pixels, in accordance with one or more embodiments.

FIG. 3A is an example sensor 300 having a plurality of augmented pixels 310, in accordance with one or more embodiments. The sensor 300 may be part of one or more imaging devices of a DCA. For example, the sensor 300 may be part of any of the imaging devices 115A, 1151B, part of some other imaging device, etc. The sensor 300 may capture, via the augmented pixels 310, light from a local area surrounding some or all of the headset 100 or the headset 200. The light captured by the augmented pixels 310 of the sensor 300 may originate from light emitted by the projector 120 and reflected from one or more objects in the local area, may originate from light emitted by some other light source (e.g., of the headset 100 or the headset 200) and reflected from the local area, may originate from ambient light of the local area, or some combination thereof. The augmented pixels 310 may be organized within the sensor 300 as a two-dimensional array of augmented pixels 310. While the sensor 300 illustrated in FIG. 3A is 16×16 sensor, in other embodiments the sensor 300 may have some other number of columns and/or rows. For example, the sensor 300 may be 3000×4000. The sensor 300 can be generally described as an R×C sensor having R rows of augmented pixels 310 and C columns of augmented pixels 310.

Figure 3B:
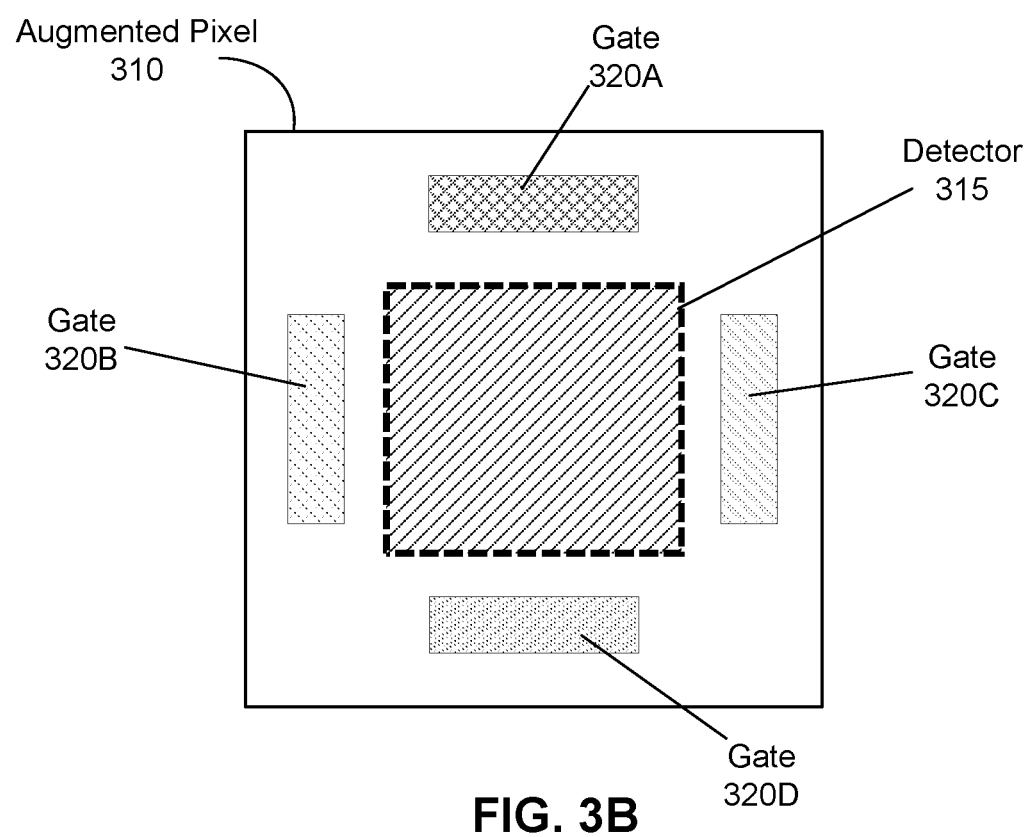
FIG. 3B is an example augmented pixel of the sensor in FIG. 3A, in accordance with one or more embodiments.

FIG. 3B is an example augmented pixel 310 of the sensor 300 in FIG. 3A, in accordance with one or more embodiments. The augmented pixel 310 captures, over multiple time intervals, intensities of light incident on a surface of the augmented pixel 310. The augmented pixel 310 includes a detector 315 and a plurality of gates, e.g., gates 320A, 320B, 320C, and 320D as shown in FIG. 3B. Although the augmented pixel 310 shown in FIG. 3B includes four gates (i.e., N=4), each augmented pixel 310 of the sensor 300 may include less than four gates (e.g., three gates) or more than four gates (e.g., nine or ten gates). In some embodiments, different augmented pixels of the sensor 300 have different numbers of gates and/or storage areas associated with the gates.

The detector 315 represents a photo-sensitive area of the augmented pixel 310. The detector 315 in-couples, e.g., through an aperture, photons of incident light and transforms the captured photons into electrons (charge). An appropriate electric field generated at a specific time interval based on, e.g., capture instructions from the DCA controller, guides the charge from the detector 315 to a local storage location associated with a specific gate, e.g., the gate 320A, 320B, or 320C or to a ground that may be coupled to the gate 320D.

Some or all of the gates 320A, 320B, 320C, 320D have a respective local storage location for storing a charge related to light captured by the detector 315 at a specific time interval. For example, the gates 320A, 320B, 320C may all have different respective local storage locations. Each gate 320A, 320B, 320C, 320D functions as a switch that is biased to either pass or not pass the charge collected at the detector 315 to, e.g., a local storage area associated with the gate or a drain (e.g., ground). In some embodiments, at least one of the gates 320A, 320B, 320C, 320D operates as a drain gate and does not have a local storage location, and instead drops a charge (e.g., via a ground) received from the detector 315 while active. For example, the gate 320D may be implemented as a drain.

The respective local storage location of each gate 320A, 320B, 320C may be implemented as an analog electron storage area (e.g., a capacitor) for storing an analog charge generated from the light captured by the detector 315. In some embodiments, the respective local storage location of each gate 320A, 320B, 320C may be coupled to an analog-to-digital converter for converting the analog charge into digital information (i.e., a digital value quantifying an amount of analog charge). Note that in a single augmented pixel 310 there is a plurality of local storage locations that are each associated with a respective gate, and the local storage locations are all local to the single augmented pixel 310 and do not belong to any other augmented pixels 310. Thus, the local storage locations are associated with the particular augmented pixel 310, and they do not represent, e.g., a memory bank separate from the sensor 300.

Figure 3C:
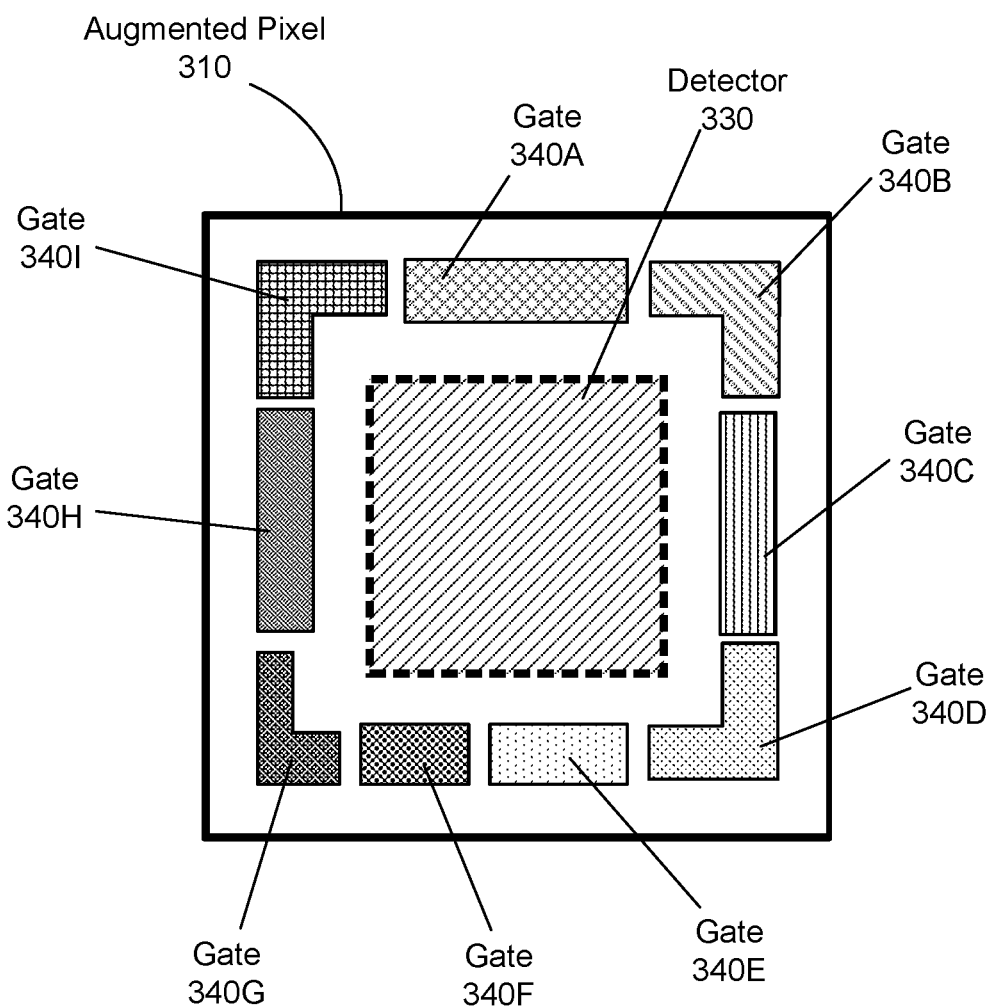
FIG. 3C is another example augmented pixel of the sensor in FIG. 3A, in accordance with one or more embodiments.

FIG. 3C is another example of the augmented pixel 310 of the sensor 300 in FIG. 3A, in accordance with one or more embodiments. The sensor 300 comprising augmented pixels 310 of FIG. 3C represent N-tap sensor with N=10, i.e., nine gates and one drain. The augmented pixel 310 captures, over multiple time intervals (e.g., nine time bins), intensities of light incident on a surface of the augmented pixel 310. The augmented pixel 310 includes a detector 330 and a plurality of nine gates, e.g., gates 340A, 340B, 340C, 340D, 340E, 340F, 340G, 340H and 340I, as shown in FIG. 3C, and nine storage areas associated with the nine gates. The augmented pixel 310 in FIG. 3C may further include a drain (not shown in FIG. 3C) that does not have a local storage location, and instead drops a charge (e.g., via a ground) received from the detector 330 while active.

The detector 330 represents a photo-sensitive area of the augmented pixel 310 and operates in the same manner as the detector 315. Some or all of the gates 340A, 340B, 340C, 340D, 340E, 340F, 340G, 340H and 340I have a respective local storage location for storing a charge related to light captured by the detector 3330 at a specific time interval. The gates 340A, 340B, 340C, 340D, 340E, 340F, 340G, 340H and 340I may have the same structure and may operate in the same manner as the gates 320A, 320B, 320C of FIG. 3B.

Figure 4:
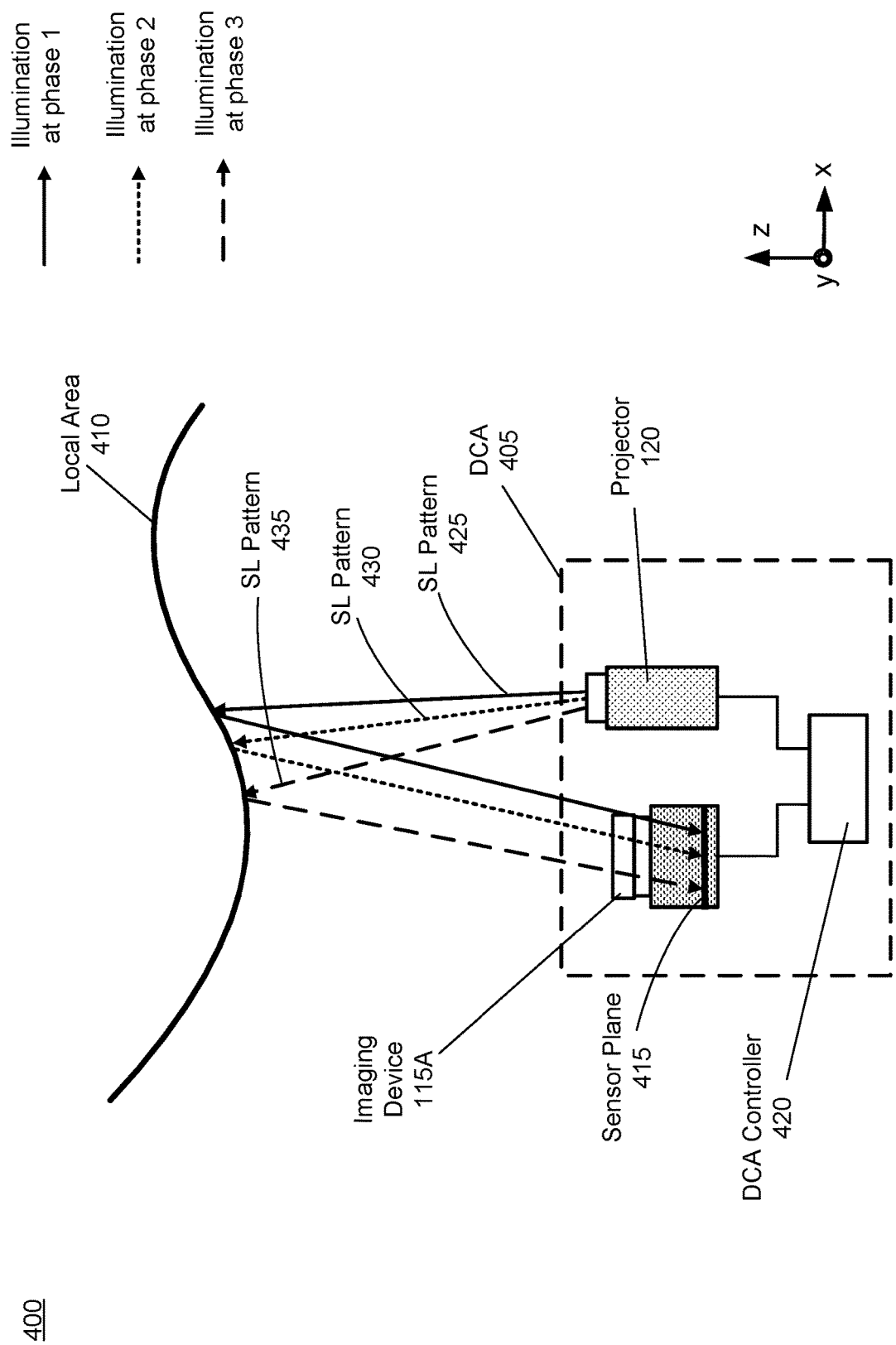
FIG. 4 is an example of illumination and imaging of a local area at a plurality of phases, in accordance with one or more embodiments.

FIG. 4 is an example 400 of illumination and imaging of a local area at a plurality of phases, in accordance with one or more embodiments. A DCA 405 projects SL patterns at a plurality of phases and determines depth images for at least a portion of a local area 410, e.g., by applying spatial coding and/or temporal coding. The DCA 405 may be an embodiment of the DCA of the headset 100 of FIG. 1 or the DCA of the headset 200 of FIG. 2. The DCA 405 includes the projector 120, the imaging device 115A with a sensor plane 415, and a DCA controller 420 coupled to the projector 120 and the imaging device 115A. Although not shown in FIG. 4, the DCA 405 may include at least one additional imaging device (e.g., the imaging device 115B) and/or a color camera (e.g., the color camera 117). Also, both the projector 120 and the imaging device 115A may have their own controllers, instead of the common DCA controller 420. The sensor plane 415 may include the sensor 300 with an array of augmented pixels 310, each augmented pixel 310 having, e.g., nine non-drain gates, as shown in FIG. 3C.

The projector 120 emits a first SL pattern 425 at a first phase into the local area 410. The imaging device 115A then images, via each augmented pixel 310 of the sensor plane 415, at least a portion of the local area 410 over a range of time that is divided into three time bins, and collects light from the first time bin in a first local storage location of a first gate (e.g., gate 340A), from the second time bin in a second local storage location of a second gate (e.g., gate 340B), and from the third time bin in a third local storage location of a third gate (e.g., gate 340C). The projector 120 emits a second SL pattern 430 that is phase shifted relative to the first SL pattern 425. The imaging device 115A then collects, via each augmented pixel 310 of the sensor plane 415, light over three time bins in local storage locations of next three gates (e.g., gates 340D, 340E, 340F). Finally, the projector 120 emits a third SL pattern 435 that is phase shifted relative to the first and second SL patterns 425, 430. The imaging device 115A then collects light, via each augmented pixel 310 of the sensor plane 415, over next three time bins in local storage locations of remaining three gates (e.g., gates 340G, 340H, 340I). The SL patterns 425, 430, 435 that are phase shifted to each other may comprise a same SL pattern. Alternatively, each phase shifted SL pattern 425, 430, 435 may be a different SL pattern. In some embodiments, each SL pattern 425, 430, 435 includes a dot pattern or a bar pattern, wherein each dot in the SL pattern (or a portion of a bar for bar pattern) may be temporally coded to facilitate TOF based depth sensing in combination with SL based depth sensing. The DCA 405 may repeat illumination of the local area 410 (e.g., same or different portions of the local area 410) using the SL patterns 425, 430, 435 a plurality of times that may depend on, e.g., a signal-to-noise ratio (SNR) associated with intensities of light stored in the local storage locations of the augmented pixel 310, e.g., shown in FIG. 3C.

After collecting light intensity signals (i.e., image data) in all locations of the augmented pixels 310 of the sensor plane 415, the DCA controller 420 initiates read-out of the stored image data. The DCA controller 420 determines, based on the stored image data, spatial depth information for the local area 415 using triangulation (e.g., using the images of the SL patterns 425, 430, 435) and temporal depth information for the local area using the collected TOF information. The spatial depth information and temporal depth information may be determined for the same field-of-view of the imaged portion of the local area 415. In some embodiments, e.g., to increase the speed of depth sensing process, the imaged portion of the local area 415 can be divided into a plurality of segments, each segment covering a field-of-view of a defined size. The DCA controller 420 may determine spatial depth information and temporal depth information for each of the segments. For each segment, the DCA controller 420 may then determine whether SL based depth information or TOF based depth information is more accurate, and apply the more accurate depth information to the segment. For example, TOF based depth information having a unique depth range larger than a threshold range can be selected for the segment to guide the phase unwrapping for SL based depth information (e.g., associated with the same or different segment). On the other hand, the SL based depth information can be selected for the segment when a depth resolution of the SL based depth information is above a threshold resolution and higher than that of the TOF based depth information. The DCA controller 420 may generate depth information for the imaged portion of the local area 415 as an aggregate depth map using depth maps applied for the segments. More details about illumination and imaging of the local area 415, as well as selection between the SL based depth information and the TOF based depth information are provided in conjunction with FIGS. 5-7.

Figure 5:
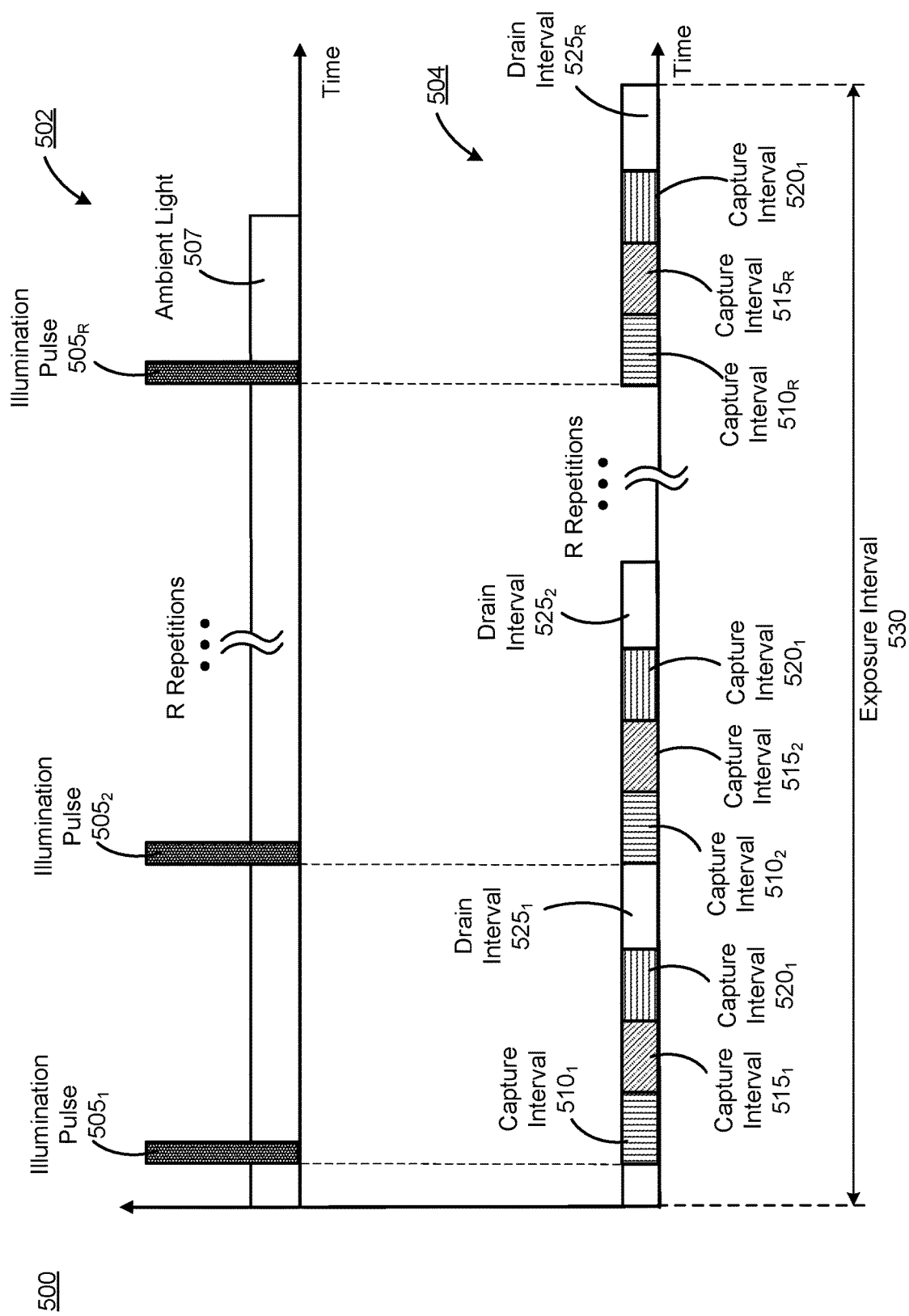
FIG. 5 is an example of timing diagrams for illumination and imaging that include a repeating capture interval in each group of capture intervals and a repeating drain interval, in accordance with one or more embodiments.

FIG. 5 is an example 500 of timing diagrams 502 and 504 for illumination and imaging that include a repeating capture interval in each group of capture intervals and a repeating drain interval, in accordance with one or more embodiments. The timing diagrams 502, 504 relate to an embodiment for operating a DCA (e.g., the DCA 405) to determine depth information for a local area, where an exposure interval of the DCA includes drain intervals.

The timing diagram 502 relates to operation of a projector (e.g., the projector 120) operating as a pulsed phasor light source, e.g., based on emission instructions from a DCA controller (e.g., the DCA controller 425). The DCA controller may instruct the projector to project pulses of light into a local area, e.g., pulses of light $505_1, 505_2, \ldots, 505_R$, where R is an integer equal or greater than one. The projector configured as a pulsed phasor light source may emit a set of discrete pulses of light $505_1, 505_2, \ldots, 505_R$ with or without a specific periodicity. Each pulse of light $505_1, 505_2, \ldots, 505_R$ may include a SL pattern, e.g., the same SL pattern or different SL patters. The SL pattern may be, e.g., temporally coded dot pattern or temporally coded bar pattern, where, e.g., each dot or each bar can be temporally coded. The number of repetitions, R, may depend on, e.g., a level of SNR associated with intensities of light stored in the local storage locations of the augmented pixel 310, e.g., shown in FIG. 3B. In some embodiments, the projector includes a plurality of light sources emitting the pulses of light $505_1, 505_2, \ldots, 505_R$. In some other embodiments, the projector includes a single light source configured to emit the pulses of light $505_1, 505_2, \ldots, 505_R$. In addition to the pulses of light $505_1, 505_2, \ldots, 505_R$ illuminating the local area surrounding the DCA, a certain level of ambient light 507 may be also present in the local area. Although the ambient light 507 is illustrated in the timing diagram 502 to have a constant level of intensity over time, the intensity of ambient light 507 may vary over time.

The timing diagram 504 is a pixel timing diagram for an augmented pixel (e.g., the augmented pixel 310 of FIG. 3B) of a sensor plane of an imaging device (e.g., any of the imaging devices 115A, 1151B). The augmented pixel 310 may operate in accordance with the timing diagram 504 based on e.g., capture instructions from the DCA controller. The augmented pixel 310 may be configured to image, over an exposure interval 530, a portion of the local area illuminated with the pulses of light, e.g., the pulses of light $505_1, 505_2, \ldots, 505_R$. The exposure interval 530 may be divided into intervals that include capture intervals and drain intervals, e.g., capture intervals $510_1, 515_1, 520_1, 510_2, 515_2, 520_2, \ldots, 510_R, 515_R, 520_R$ and drain intervals $525_1, 525_2, \ldots, 525_R$, as shown in FIG. 5. As shown in FIG. 5, the capture intervals $510_1, 510_2, \ldots, 510_R$ are synchronized to the pulses of light $505_1, 505_2, \ldots, 505_R$, respectively.

In the embodiment of FIG. 5, the augmented pixel 310 includes four gates, e.g., 320A, 320B, 320C, and 320D of FIG. 3B, where 320A, 320B, and 320C have an associated local storage area, and 320D is a drain. During the capture intervals $510_1, 510_2, \ldots, 510_R$, one of the gates 320A, 320B, 320C (e.g., the gate 320A) may be activated to enable an associated local storage location to store image data (i.e., intensities of light) associated with portions of the pulses of light $505_1, 505_2, \ldots, 505_R$ reflected from a first portion of the local area corresponding to a first range of distances from the camera assembly. The other gates (e.g., all but 320A) are inactive during the capture intervals $510_1, 510_2, \ldots, 510_R$. During the capture intervals $515_1, 515_2, \ldots, 515_R$, one of the gates 320A, 320B, 320C (e.g., the gate 320B) may be activated to enable an associated local storage location to store image data (i.e., intensities of light) associated with portions of the pulses of light $505_1, 505_2, \ldots, 505_R$ reflected from a second portion of the local area corresponding to a second range of distances from the camera assembly, and the second range of distances is farther from the camera assembly than the first range of distances. The other gates (e.g., all but 320B) are inactive during the capture intervals $515_1, 515_2, \ldots, 515_R$. During the capture intervals $520_1, 520_2, \ldots, 520_R$, one of the gates 320A, 320B, 320C (e.g., the gate 320C) may be activated to enable an associated local storage location to store image data (i.e., intensities of light) associated with portions of the pulses of light $505_1, 505_2, \ldots, 505$ reflected from a third portion of the local area corresponding to a third range of distances from the camera assembly, and the third range of distances is farther from the camera assembly than the second range of distances. The other gates (e.g., all but 320C) are inactive during the capture intervals $520_1, 520_2, \ldots, 520_R$.

Drain intervals $525_1, 525_2, \ldots, 525_R$ occur after the end of capture intervals $520_1, 520_2, \ldots, 520_{R-1}$, respectively. During each of the drain intervals $525_1, 525_2, \ldots, 525_R$, the drain gate 320D of the augmented pixel 310 may be activated so that charges related to light detected by the augmented pixel 310 during the drain intervals $525_1$, $525_2$, ..., $525_R$ are not recorded (e.g., may be shunted to ground). In some embodiments, a corresponding drain interval $525_1$, $525_2$, ... $525_R$ may be placed after each capture interval $520_1$, $520_2$, ..., $520_{R-1}$, to provide some cooling time for the camera assembly (e.g., the imaging device 115A) between high power pulses of light $505_1$, $505_2$, ..., $505_R$ designed to overwhelm the ambient light 507. Also, inserting a corresponding drain interval $525_1$, $525_2$, ..., $525_R$ after each capture interval $520_1$, $520_2$, ..., $520_{R-1}$ helps prevent light from objects far away from ending up being detected in a first capture interval in a group of capture intervals (i.e., any of the capture intervals $510_2$, ..., $510_R$). Thus, a corresponding drain interval $525_1$, $525_2$, ..., $525_R$ inserted after each capture interval $520_1$, $520_2$, ..., $520_{R-1}$ acts to isolate groups of capture intervals from each other.

The timing diagram 504 can be replicated for each augmented pixel (e.g., the augmented pixel 310) of the sensor plane of the imaging device. Corresponding local storage locations of each augmented pixel of the imaging device may store image data associated with the corresponding pulses of light $505_1$, $505_2$, ..., $505_R$. The image data may be stored in the local storage locations of each augmented pixel during corresponding capture intervals of the exposure interval 530.

After the exposure interval 530, e.g., during a read out interval (not shown in FIG. 5), the DCA controller initiates read-out of the image data stored in the local storage locations of each augmented pixel of the imaging device. The DCA controller obtains the stored image data and generates one or more image data frames. The DCA controller may then determine depth information for the local area, based in part on the one or more image data frames using, e.g., TOF based depth sensing, SL based depth sensing, or combination thereof. More details about determining depth information using TOF information from the stored image data are further described in U.S. patent application Ser. No. 16/219,502, U.S. patent application Ser. No. 16/219,511, and U.S. patent application Ser. No. 16/219,518, filed on Dec. 13, 2018, which are hereby incorporated by references in their entireties.

In some other embodiments, each augmented pixel in a sensor of a DCA (e.g., the augmented pixel 310) may have additional gates (e.g., more than three non-drain gates) for capturing light reflected from different portions of a local area surrounding the DCA. Thus, instead of three capture intervals that are associated with each pulse of light illustrated in FIG. 5, additional capture intervals would be included into the exposure interval 530 that are associated with each pulse of light emitted from a light source assembly of the DCA.

Figure 6:
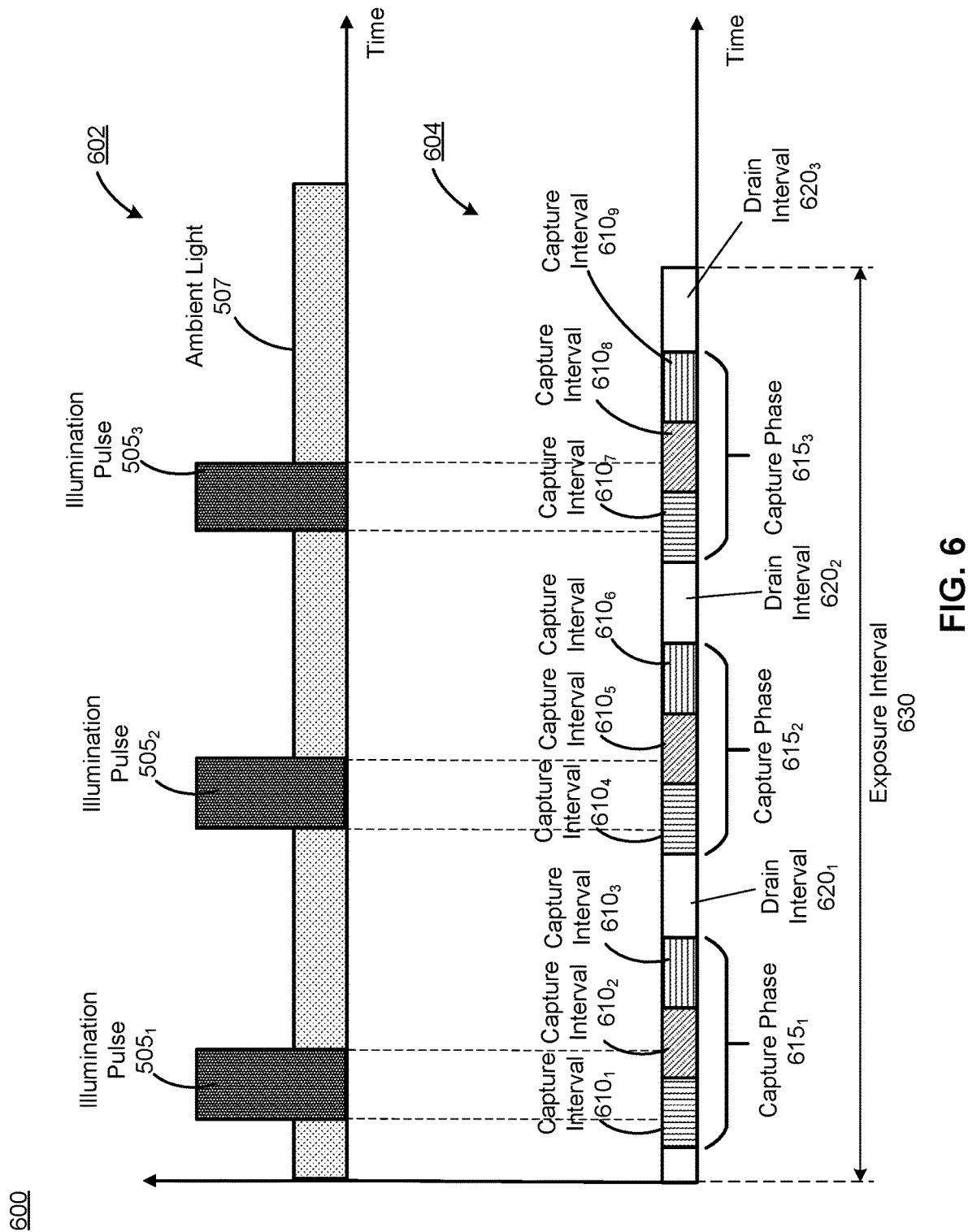
FIG. 6 is an example of timing diagrams for illumination and imaging that include multiple capture phases and a repeating drain interval in an exposure interval for spatial and temporal imaging, in accordance with one or more embodiments.

FIG. 6 is an example 600 of timing diagrams 602 and 604 for illumination and imaging that include multiple capture phases and a repeating drain interval in an exposure interval for spatial and temporal imaging, in accordance with one or more embodiments. The timing diagrams 602, 604 relate to an embodiment for operating a DCA (e.g., the DCA 405) to determine depth information for a local area, where an exposure interval of the DCA includes multiple capture phases and drain intervals.

The timing diagram 602 relates to an operation of a projector (e.g., the projector 120) operating as a pulsed phasor light source, e.g., based on emission instructions from a DCA controller (e.g., the DCA controller 425). The DCA controller may instruct the projector to project pulses of light into a local area, e.g., pulses of light $505_1$, $505_2$, $505_3$, as described above in conjunction with FIG. 5. Note that the timing diagram 602 corresponds to the timing diagram 502 of FIG. 5 where R=3. The pulses of light $505_1$, $505_2$, $505_3$ may be repeated a plurality of times depending on, e.g., a SNR associated with intensities of light stored in local storage locations of an augmented pixel of a sensor of the DCA, e.g., the augmented pixel 310 of FIG. 3C with nine gates and one drain.

The timing diagram 604 is a pixel timing diagram for an augmented pixel of a sensor plane of an imaging device (e.g., the sensor plane 415 of the imaging device 115A). The augmented pixel 310 may operate in accordance with the timing diagram 604 based on e.g., capture instructions from the DCA controller. An exposure interval 630 of the augmented pixel 310 may be divided into intervals that include capture intervals and drain intervals, e.g., capture intervals (or time bins) $610_1$, $610_2$, $610_3$, ..., $610_M$, and drain intervals $620_1$, $620_2$, $620_3$, where M is a number of non-drain gates in the augmented pixel 310 that are associated with local storage areas. For the timing diagram 604 shown in FIG. 6, M=9, i.e., the augmented pixel 310 includes nine gates with local storage areas, e.g., as shown in FIG. 3C. As further shown in FIG. 6, the exposure interval 630 is divided into multiple capture phases $615_1$, $615_2$, $615_3$, each capture phase $615_1$, $615_2$, $615_3$ including a corresponding subset of capture intervals (time bins) and is at least partially synchronized with a corresponding SL pattern $505_1$, $505_2$, $505_3$.

In the embodiment of FIG. 6, the augmented pixel 310 includes ten gates, e.g., nine non-drain gates 340A, 340B, 340C, 340D, 340E, 340F, 340G, 340H and 340I with associated local storage areas, and an additional gate that is not associated with any local storage area and operates as a drain. During each capture interval (or time bin) $610_1$, $610_2$, $610_3$ of the capture phase $615_1$, a different gate in a first subset of the gates (e.g., gates 320A, 320B, 320C) may be activated to enable an associated local storage location to store image data (i.e., intensities of light) associated with portions of the pulse of light $505_1$ reflected from at least the portion of the local area. Other gates not in the first subset (e.g., all but 320A, 320B, 320C) are inactive during the capture phase $615_1$. The pulse of light $505_1$ can be at least partially overlapped with multiple capture intervals (time bins) of the capture phase $615_1$, e.g., capture intervals $610_1$, $610_2$ are partially overlapped with the pulse of light $505_1$. During each capture interval (or time bin) $610_4$, $610_5$, $610_6$ of the capture phase $615_2$, a different gate in a second subset of the gates (e.g., gates 320D, 320E, 320F) may be activated to enable an associated local storage location to store image data (i.e., intensities of light) associated with portions of the pulse of light $505_2$ reflected from at least the portion of the local area. Other gates not in the second subset (e.g., all but 320D, 320E, 320F) are inactive during the capture phase $615_2$. The pulse of light $505_2$ can be at least partially overlapped with multiple capture intervals (time bins) of the capture phase $615_2$, e.g., capture intervals $610_4$, $610_5$ are partially overlapped with the pulse of light $505_2$. During each capture interval (time bin) $610_7$, $610_8$, $610_9$ of the capture phase $615_3$, a different gate in a third subset of the gates (e.g., gates 320G, 320H, 320I) may be activated to enable an associated local storage location to store image data (i.e., intensities of light) associated with portions of the pulse of light $505_3$ reflected from the local area. Other gates not in the third subset (e.g., all but 320G, 320H, 320I) are inactive during the capture phase $615_3$. The pulse of light $505_3$ can be at least partially overlapped with multiple capture intervals (time bins) of the capture phase $615_3$, e.g., capture intervals $610_7$, $610_8$ are partially overlapped with the pulse of light $505_3$.

Drain intervals $620_1$, $620_2$, $620_3$ occur after the end of capture phases $615_1$, $615_2$, $615_3$, respectively. During each of the drain intervals $620_1$, $620_2$, $620_3$, the drain gate of the augmented pixel 310 of FIG. 3C may be activated so that charges related to light detected by the augmented pixel 310 during the drain intervals $620_1$, $620_2$, $620_3$ are not recorded (e.g., may be shunted to ground). A corresponding drain interval $620_1$, $620_2$, $620_3$ may be placed after each capture phase $615_1$, $615_2$, $615_3$, to provide some cooling time for the DCA, similarly as the drain intervals $525_1$, $525_2$, ... $525_R$. Overall, the drain intervals $620_1$, $620_2$, $620_3$ have substantially similar functions as the drain intervals $525_1$, $525_2$, ... $525_R$.

Within each capture phase $615_1$, $615_2$, $615_3$, the SL pattern projected in the corresponding illumination pulse $505_1$, $505_2$, $505_3$ is not changed. Thus, within each capture phase $615_1$, $615_2$, $615_3$, the DCA can behave as a TOF based DCA, and the DCA controller can determine depth information using the TOF depth sensing based on image data captured during capture intervals of one of the capture phases $615_1$, $615_2$, $615_3$ (e.g., during the capture intervals $610_1$, $610_2$, $610_3$ of the capture phase $615_1$). On the other hand, the SL patterns projected by the illumination pulses $505_2$ and $505_3$ are phase-shifted relative to the illumination pulse $505_1$. Thus, the DCA controller can use the phase-shifted SL depth sensing to determine depth information from triangulation by using image data captured during the capture intervals $610_1$, $610_4$ and $610_7$ of three different capture phases $615_1$, $615_2$, $615_3$. Hence, when the timing diagram 604 shown in FIG. 6 is applied for capturing image data for the TOF depth sensing and the phase-shifted SL depth sensing, the augmented pixel 310 having M=9 non-drain gates is required as there are three capture intervals per capture phase for the TOF depth sensing and three capture phases for the phase-shifted SL depth sensing. In some other embodiments (not shown in FIG. 3C and FIG. 6), the number of non-drain gates M in each augmented pixel 310 can be larger than nine. For example, three or four capture intervals within a capture phase can be used for the TOD depth sensing, and three or four capture phases can be used for the phase-shifted SL depth sensing. i.e., M=12 or M=16. In yet some other embodiments (not shown in FIG. 3C and FIG. 6), the number of non-drain gates M in each augmented pixel 310 can be less than nine. In one or more embodiments, a version of the phase-shifted SL depth sensing may require only two capture phases or even one capture phase. In such cases, the required number of non-drain gates M in the augmented pixel 310 can be six (i.e., three capture intervals per capture phase and two capture phases), three (i.e., three capture intervals per capture phase and one capture phase), or two (i.e., two capture intervals per capture phase and one capture phase).

The timing diagram 604 can be replicated for each augmented pixel (e.g., the augmented pixel 310 of FIG. 3C) of the sensor plane of the imaging device. Corresponding local storage locations of each augmented pixel of the imaging device may store image data associated with the corresponding pulses of light $505_1$, $505_2$, $505_3$. The image data may be stored in the local storage locations of each augmented pixel during corresponding capture intervals of the exposure interval 630. Furthermore, the timing diagram 604 can be repeated multiple times for the augmented pixel 310 of FIG. 3C, where the number of repetitions may depend on, e.g., a SNR associated with intensities of light stored in the local storage locations of the augmented pixel 310 shown in FIG. 3C. For example, hundreds or thousands of iterations of the timing diagram 604 and the exposure interval 630 may occur prior to a single read out of the stored image data.

After the exposure interval 630 (or multiple iterations of the timing diagram 604 and the exposure interval 630), e.g., during a read out interval (not shown in FIG. 6), the DCA controller initiates read-out of the image data stored in the local storage locations of each augmented pixel of the imaging device. The DCA controller obtains the stored image data and generates one or more image data frames. The DCA controller may then determine depth information for the local area, based in part on the one or more image data frames using various depth sensing techniques, e.g., TOF (or temporal) based depth sensing, phase-shifted SL based depth sensing (e.g., based on fringe illumination), some other depth sensing technique, or combination thereof. Note that the main difference between the SL based depth sensing and the TOF based depth sensing is a modulation of emitted illumination light. The modulation of emitted illumination light is in spatial domain in the case of SL based depth sensing, whereas the modulation of emitted illumination light is in temporal domain in the case of TOF based depth sensing.

In some embodiments, the DCA controller may obtain first image data stored in the local storage locations associated with the first subset of the gates (e.g., gates 320A, 320B, 320C), the second subset of the gates (e.g., gates 320D, 320E, 320F), or the third subset of the gates (e.g., gates 320G, 320H, 320I). The DCA controller may determine temporal coding depth information for at least the portion of the local area using TOF information collected using the first image data. The DCA controller 425 may further obtain second image data stored in the local storage locations associated with the gates $320_A$, $320_D$, $320_G$ (or, alternatively, the local storage locations associated with the gates $320_B$, $320_E$, $320_H$, or the local storage locations associated with the gates $320_C$, $320_F$, $320_I$). The DCA controller may apply the phase-shifted SL algorithm on the second image data to determine spatial coding depth information for at least the portion of the local area. The DCA controller may determine depth information for at least the portion of the local area based on the temporal coding depth information and/or the spatial coding depth information.

In one or more embodiments, the DCA controller determines the depth information for some or all of the local area (e.g., over an entire field-of-view of the DCA) using the spatial coding depth information or the temporal depth information. The DCA controller may determine a quality metric of the spatial coding depth information and another quality metric of the temporal depth information. The DCA controller may select depth information for the entire field-of-view, based on the determined quality metrics. In an embodiment, the DCA controller determines the depth information for the entire field-of-view using the spatial coding depth information, if the quality metric for the temporal depth information is below the other quality metric for the spatial coding depth information, and vice versa. A quality metric may be based on a depth resolution (i.e., a minimum depth value that the sensor 300 can differentiate), a depth accuracy (i.e., an error between a measured depth value and a ground truth depth value), a depth precision (i.e., a standard deviation of depth estimations for a defined number of measurements), a level of SNR, some other quality metric, or combination thereof.

For each augmented pixel 310, the DCA controller can determine a detected illumination signal and an ambient signal (e.g., a common background signal). The ambient signal effectively acts as a noise on top of a shot noise in the illumination pattern and any other noise terms. One example definition for the SNR of the augment pixel 310 is the intensity carried by the illumination pattern divided by the ambient noise and shot noise and any other noise terms. A level of SNR can be defined for TOF depth sensing and for SL depth sensing, respectively. The level of SNR can be used to determine the quality metric for each augmented pixel 310, or for a region or a segment of the imaged portion of the local area.

In one or more other embodiments, the DCA controller divides the local area into a plurality of segments. For each segment, the DCA controller determines first depth information using SL information collected based on a portion of image data stored, e.g., in the local storage locations associated with the gates $320_A$, $320_D$, $320_G$ (or, alternatively, the local storage locations associated with the gates $320_B$, $320_E$, $320_H$, or the local storage locations associated with the gates $320_C$, $320_F$, $320_I$). For each segment, the DCA controller also determines second depth information using TOF information collected based on another portion of image data stored in, e.g., the local storage locations associated with the first subset of the gates (e.g., gates 320A, 320B, 320C), the second subset of the gates (e.g., gates 320D, 320E, 320F), or the third subset of the gates (e.g., gates 320G, 320H, 320I). For each segment, the DCA controller evaluates quality metrics for the first (i.e., SL based) depth information and the second (TOF based) depth information. For each segment, the DCA controller assigns the first depth information or the second depth information to be a depth map for that segment, e.g., based on whether the quality metric of the first depth information or the quality metric of the second depth information is higher (i.e., which depth information for that particular segment is more accurate). In some embodiments, the DCA controller can utilize a neural network (e.g., integrated into the DCA controller or separate from the DCA controller) to apply one or more machine learning algorithms to select a SL depth map or a TOF depth map for the segment. In one embodiment, the neural network can be fed with raw captured images onto which the one or more machine learning algorithms are applied. In another embodiment, the neural network can be fed with the SL depth map and the TOF depth map applied to the one or more machine learning algorithms. The DCA controller generates the depth information for the entire field-of-view of the local area as an aggregate depth map for the entire field-of-view using depth maps assigned for the individual segments.

In some embodiments, the TOF depth information can be used for phase unwrapping (e.g., for determination of a rough depth range), whereas the SL depth information can be utilized for fine resolution (e.g., refinement of the rough depth range). This can be applied once to an entire field-of-view of the imaged portion of the local area, or for each segment of the plurality of segments into which the imaged portion of the local area is divided. In some other embodiments, the DCA controller combines the TOF depth information and the SL depth information according to their respective SNRs. For example, if a SNR of the TOF depth information is higher than that of the SL depth information, the DCA controller can apply a larger weight to the TOF depth information, and vice versa when the SL depth information has a higher SNR. Alternatively, the DCA controller selects the TOF depth information as depth information if its SNR is higher than that of the SL depth information, and vice versa if the SL depth information has a higher SNR. Note that the aforementioned selection of depth information based on SNR (or some other quality metric) can be applied once to an entire field-of-view of the imaged portion of the local area, or for each segment of the plurality of segments into which the imaged portion of the local area is divided. Similarly, the aforementioned selection of depth information based on SNR (or some other quality metric) can be applied for each augmented pixel 310 of the sensor 300 or for at least a group of augmented pixels 310 in the sensor 300.

FIG. 7 is a flow chart illustrating a process 700 of depth sensing based on spatial and temporal imaging, in accordance with one or more embodiments. The process 700 of FIG. 7 may be performed by a DCA, e.g., the DCA of the headset 100 (or of the headset 200). Other entities (e.g., one or more other components of the headset 100 or the headset 200) may perform some or all of the steps of the process in other embodiments. Likewise, embodiments may include different and/or additional steps, or perform the steps in different orders.

The DCA emits 710 (via a projector, e.g., the projector 120) a SL pattern at a plurality of phases into a local area. Projected SL patterns are phase shifted relative to each other, and may correspond to pulses of light $605_1$, $605_2$, $605_3$. The projected SL patterns may be identical. Alternatively, the projected SL patterns may be different. The SL patterns emitted at different phases may be temporally coded.

The DCA images 720 (e.g., via the sensor 300) the local area, the sensor including a plurality of augmented pixels, each augmented pixel (e.g., the augmented pixel 310) having a plurality of gates and at least some of the gates have a respective local storage location. Each of a plurality of capture phases (e.g., capture phases $615_1$, $615_2$, $615_3$) of the augmented pixel is divided into a respective plurality of time bins (or capture intervals) associated with a respective subset of the gates. Each local storage location of the subset of gates stores image data during a respective time bin, the image data based on portions of the SL pattern emitted at a respective phase and reflected from the local area.

The DCA determines 730 (e.g., via the DCA controller) depth information for the local area based on the image data stored during at least one of the capture phases. The DCA may determine spatial coding depth information for the local area using image data stored in the local storage locations during each capture phase of the plurality of capture phases (e.g., the capture phases $615_1$, $615_2$, $615_3$). The DCA may determine temporal coding depth information for the local area using TOF information collected during a single capture phase. The DCA determines 730 the depth information based on the spatial coding depth information and/or the temporal coding depth information. In an embodiment, the DCA determines 730 the depth information based on the spatial coding depth information when the accuracy of the temporal coding depth information is not satisfactory (e.g., a quality metric for the temporal coding depth information is below a threshold and/or is smaller than a quality metric for the spatial coding depth information). In one or more embodiments, the DCA determines, for each segment of a plurality of segments of the local area, temporal coding depth information for the segment and spatial coding depth information for the segment. The DCA assigns, for each segment, the temporal coding depth information or the spatial coding depth information, e.g., depending on their quality metrics. The DCA determines 730 the depth information for the local area as an aggregate depth map of the local area using depth maps assigned for the segments.

The DCA presented herein may be integrated into a headset as part of an AR system. In this case, the headset may be configured to sense and display objects behind a head of a user wearing the headset or display objects recorded previously. Alternatively, the DCA with the projector may be integrated into a base station or a sensor bar external to the headset. In this case, the DCA may be configured to sense various body parts of a user wearing the headset or portions of an environment, e.g., for recording the geometry of a user or a local area, hand-tracking, eye-tracking, face recognition, gesture recognition, environment scanning, environment reconstruction, etc. In some embodiments, the DCA is integrated into a portable computing platform (e.g., a mobile phone or tablet).

System Environment

Figure 8:
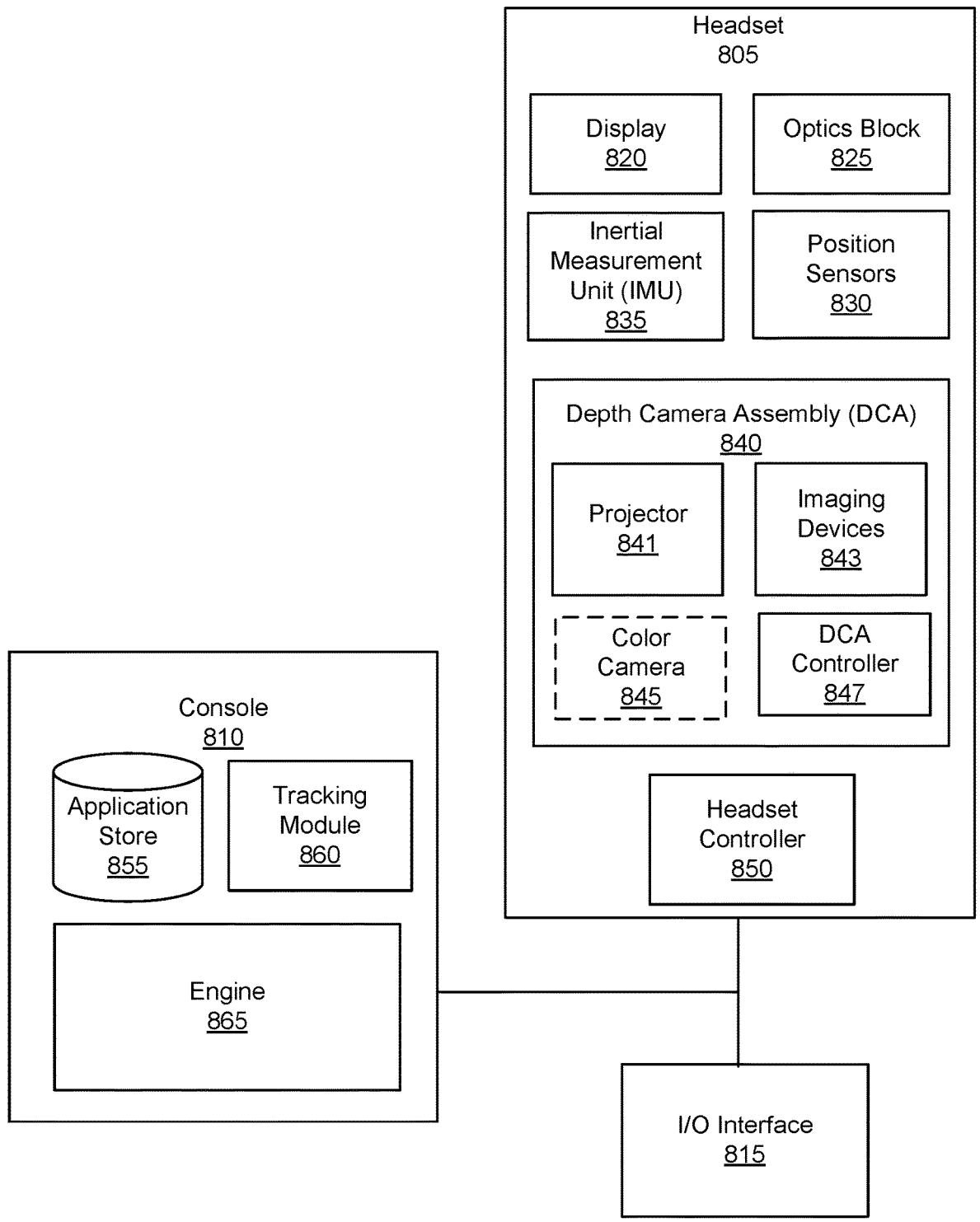
FIG. 8 is a block diagram of a system environment that includes a headset, in accordance with one or more embodiments.

FIG. 8 is a block diagram of a system environment that includes a headset, in accordance with one or more embodiments. The system 800 may operate in an artificial reality environment, e.g., a virtual reality, an augmented reality, a mixed reality environment, or some combination thereof. The system 800 shown by FIG. 8 comprises a headset 805 and an input/output (I/O) interface 815 that is coupled to a console 810. While FIG. 8 shows an example system 800 including one headset 805 and on I/O interface 815, in other embodiments any number of these components may be included in the system 800. For example, there may be multiple headsets 805 each having an associated I/O interface 815, with each headset 805 and I/O interface 815 communicating with the console 810. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the headset 805.

The headset 805 is a NED or a HMD that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 805, the console 810, or both, and presents audio data based on the audio information. The headset 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the headset 805 is the headset 100 of FIG. 1 implemented as a NED. Another embodiment of the headset 805 is the headset 200 of FIG. 2 implemented as a MD.

The headset 805 may include a display 820, an optics block 825, one or more position sensors 830, an IMU 835, a DCA 840, and a headset controller 850. Some embodiments of the headset 805 have different and/or additional components than those described in conjunction with FIG. 8. Additionally, the functionality provided by various components described in conjunction with FIG. 8 may be differently distributed among the components of the headset 805 in other embodiments.

The display 820 displays two-dimensional or three-dimensional images to the user in accordance with data received from the console 810. In various embodiments, the display 820 comprises a single display or multiple displays (e.g., a display for each eye of a user). Examples of the display 820 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. Content displayed on the display 820 may include the depth information determined by the DCA 840. An embodiment of the display 820 is the display element 110.

The optics block 825 magnifies image light received from the display 820, corrects optical errors associated with the image light, and presents the corrected image light to a user of the headset 805. In various embodiments, the optics block 825 includes one or more optical elements. Example optical elements included in the optics block 825 include: an aperture, a Fresnel lens, a convex lens, a concave lens, a filter, a reflecting surface, or any other suitable optical element that affects image light. Moreover, the optics block 825 may include combinations of different optical elements. In some embodiments, one or more of the optical elements in the optics block 825 may have one or more coatings, such as partially reflective or anti-reflective coatings.

Magnification and focusing of the image light by the optics block 825 allows the display 820 to be physically smaller, weigh less, and consume less power than larger displays. Additionally, magnification may increase the field of view of the content presented by the display 820. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 825 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 825 corrects the distortion when it receives image light from the electronic display generated based on the content.

The IMU 835 is an electronic device that generates data indicating a position of the headset 805 based on measurement signals received from one or more of the position sensors 830. A position sensor 830 generates one or more measurement signals in response to motion of the headset 805. Examples of position sensors 830 include: one or more accelerometers, one or more gyroscopes, one or more magnetometers, another suitable type of sensor that detects motion, a type of sensor used for error correction of the IMU 835, or some combination thereof. The position sensors 830 may be located external to the IMU 835, internal to the IMU 835, or some combination thereof. An embodiment of the position sensor 835 is the position sensor 130.

The DCA 840 includes a projector 841, imaging devices 843, an optional color camera 845 and a DCA controller 847. The DCA 840 generates depth image data of a local area surrounding some or all of the headset 805. Depth image data includes pixel values defining distance from the imaging device, and thus provides a (e.g., 3D) mapping of locations captured in the depth image data. Embodiments of the DCA 840 is the DCA of the headset 100, the DCA of the headset 200, and the DCA 405. Embodiments of the imaging devices 843 are the imaging devices 115A, 115B. Each of the imaging devices 843 includes the sensor 300 with an array of augmented pixels 310, wherein each augmented pixel 310 is implemented e.g., as shown in FIG. 3C and operates in accordance with the timing diagram 604 shown in FIG. 6. An embodiment of the color camera 845 is the color camera 117.

In some embodiments, the DCA 840 generates depth image data using the SL depth sensing technique. The DCA 840 may emit SL and determine depth information for the local area by capturing reflected and deformed SL pattern. In some other embodiments, the DCA 840 generates depth image data using the TOF depth sensing technique. The DCA 840 may generate the depth image data based on time required to light to be emitted from the projector 841 until at least a portion of the light reflected from one or more objects in the local area is captured by the imaging devices 843 and the color camera 845. In some other embodiments, the DCA 840 generates depth information for the local area by combining depth image data obtained by capturing SL and TOF depth image data. In some other embodiments, the DCA 840 generates depth image data using active or passive stereo imaging. By comparing information about a local area from two vantage points, the DCA 840 may extract depth information based on relative positions of objects in two panels.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 835 that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the headset 805 for processing in accordance with information received from one or more of: the DCA 840, the headset controller 850, and the I/O interface 815. In the example shown in FIG. 8, the console 810 includes an application store 860, a tracking module 865, and an engine 870. Some embodiments of the console 810 have different modules or components than those described in conjunction with FIG. 8. Similarly, the functions further described below may be distributed among components of the console 810 in a different manner than described in conjunction with FIG. 8.

The application store 855 stores one or more applications for execution by the console 810. An application is a group of instructions, that when executed by a processor, generates content for presentation to the user. Content generated by an application may be in response to inputs received from the user via movement of the headset 805 or the I/O interface 815. Examples of applications include: gaming applications, conferencing applications, video playback applications, or other suitable applications.

The tracking module 860 calibrates the system 800 using one or more calibration parameters and may adjust one or more calibration parameters to reduce error in determination of the position of the headset 805 or of the I/O interface 815. For example, the tracking module 860 communicates a calibration parameter to the DCA 840 to adjust the focus of the DCA 840 to more accurately determine positions of SL elements captured by the DCA 840. Calibration performed by the tracking module 860 also accounts for information received from the IMU 835 in the headset 805 and/or an IMU included in the I/O interface 815. Additionally, if tracking of the headset 805 is lost (e.g., the DCA 840 loses line of sight of at least a threshold number of SL elements), the tracking module 860 may re-calibrate some or all of the system 800.

The tracking module 860 tracks movements of the headset 805 or of the I/O interface 815 using information from the DCA 840, the one or more position sensors 830, the IMU 835, or some combination thereof. For example, the tracking module 860 determines a position of a reference point of the headset 805 in a mapping of a local area based on information from the headset 805. The tracking module 860 may also determine positions of the reference point of the headset 805 or a reference point of the I/O interface 815 using data indicating a position of the headset 805 from the IMU 835 or using data indicating a position of the I/O interface 815 from an IMU 835 included in the I/O interface 815, respectively. Additionally, in some embodiments, the tracking module 860 may use portions of data indicating a position or the headset 805 from the IMU 825 as well as representations of the local area from the DCA 840 to predict a future location of the headset 805. The tracking module 860 provides the estimated or predicted future position of the headset 805 or the I/O interface 815 to the engine 865.

The engine 865 generates a three-dimensional mapping of the area surrounding the headset 805 (i.e., the "local area") based on information received from the headset 805. In some embodiments, the engine 865 determines depth information for the three-dimensional mapping of the local area based on information received from the DCA 840 that is relevant for techniques used in computing depth. The engine 865 may calculate depth information using one or more techniques in computing depth from the portion of the reflected light detected by the DCA 840, such as the stereo based techniques, the SL illumination techniques, and the TOF techniques. In various embodiments, the engine 865 uses the depth information to, e.g., update a model of the local area, and generate content based in part on the updated model.

The engine 865 also executes applications within the system 800 and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual environment or in an environment augmenting the local area with additional content. Additionally, the engine 865 performs an action within an application executing on the console 810 in response to an action request received from the I/O interface 815 and provides feedback to the user that the action was performed. The provided feedback may be visual or audible feedback via the headset 805 or haptic feedback via the I/O interface 815.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A camera assembly comprising:
    a sensor including a plurality of pixels, each pixel having a plurality of gates with a plurality of local storage locations, an exposure interval of each pixel divided into a plurality of capture intervals associated with the gates, each local storage location storing image data during a respective capture interval of the plurality of capture intervals; and
    a controller configured to:
        determine first depth information for a local area based on time-of-flight (TOF) information collected using the image data stored during a first subset of the capture intervals,
        determine second depth information for the local area based on structured light (SL) information collected using the image data stored during a second subset of the capture intervals, and
        determine depth information for a plurality of segments of the local area using at least one portion of the first depth information and at least one portion of the second depth information.

2. The camera assembly of claim 1, wherein the controller is further configured to:
    determine a corresponding portion of the depth information for each segment of the plurality of segments, based on a first quality metric for a respective portion of the TOF information associated with each segment and a second quality metric for a respective portion of the SL information associated with each segment.

3. The camera assembly of claim 2, wherein the controller is further configured to:
    assign, for each segment based on the first and second quality metrics, a respective portion of the first depth information or a respective portion of the second depth information to be a respective depth map of a plurality of depth maps for each segment; and
    generate the depth information for the local area as an aggregate depth map of the plurality of depth maps assigned for the plurality of segments.

4. The camera assembly of claim 2, wherein the controller is further configured to:
    assign, for each segment based on the first and second quality metrics, a combination of a respective portion of the first depth information and a respective portion of the second depth information to be a respective depth map of a plurality of depth maps for each segment; and
    generate the depth information for the local area as an aggregate depth map of the plurality of depth maps assigned for the plurality of segments.

5. The camera assembly of claim 2, wherein the first and second quality metrics comprise information about signal-to-noise ratios associated with the image data stored during the first and second subsets of capture intervals.

6. The camera assembly of claim 1, wherein the at least one portion of the first depth information is associated with at least one segment of the plurality of segments, and the at least one portion of the second depth information is associated with one or more segments of the plurality of segments.

7. The camera assembly of claim 1, wherein:
    first capture intervals of the plurality of capture intervals are associated with a first subset of the gates, each local storage location of the first subset of gates stores first image data during a respective first capture interval, the first image data based on portions of an illumination pattern emitted at a first phase of a plurality of phases and reflected from the local area;

second capture intervals of the plurality of capture intervals following the first capture intervals are associated with a second subset of the gates, each local storage location of the second subset of gates stores second image data during a respective second capture interval, the second image data based on portions of the illumination pattern emitted at a second of the phases and reflected from the local area; and third capture intervals of the plurality of capture intervals following the second capture intervals are associated with a third subset of the gates, each local storage location of the third subset of gates stores third image data during a respective third capture interval, the third image data based on portions of the illumination pattern emitted at a third of the phases and reflected from the local area.

8. The camera assembly of claim 7, wherein the controller is further configured to:

determine the depth information using at least one of the first image data, the second image data and the third image data.

9. The camera assembly of claim 7, wherein:

the TOF information is collected using the first image data, the second image data or the third image data, and the SL information is collected using the first image data, the second image data and the third image data.

10. The camera assembly of claim 1, wherein:

one or more of the plurality of gates comprise a drain gate, the exposure interval further includes a plurality of drain intervals, and the controller is further configured to enable, during each drain interval, activation of the drain gate.

11. The camera assembly of claim 1, wherein the camera assembly is part of a headset.

12. A method comprising:

instructing a sensor to image the local area, the sensor including a plurality of pixels, each pixel having a plurality of gates with a plurality of local storage locations, an exposure interval of each pixel divided into a plurality of capture intervals associated with the gates, each local storage location storing image data during a respective capture interval of the plurality of capture intervals;

determining first depth information for a local area based on time-of-flight (TOF) information collected using the image data stored during a first subset of the capture intervals;

determining second depth information for the local area based on structured light (SL) information collected using the image data stored during a second subset of the capture intervals; and determining depth information for a plurality of segments of the local area using at least one portion of the first depth information and at least one portion of the second depth information.

13. The method of claim 12, further comprising:

determining a corresponding portion of the depth information for each segment, based on a first quality metric for each portion of the TOF information associated with each segment and a second quality metric for each portion of the SL information associated with each segment.

14. The method of claim 13, further comprising:

assigning, for each segment based on the first and second quality metrics, a respective portion of the first depth information or a respective portion of the second depth information to be a respective depth map of a plurality of depth maps for each segment; and generating the depth information for the local area as an aggregate depth map of the plurality of depth maps assigned for the plurality of segments.

15. The method of claim 13, further comprising:

assigning, for each segment based on the first and second quality metrics, a combination of a respective portion of the first depth information and a respective portion of the second depth information to be a respective depth map of a plurality of depth maps for each segment; and generating the depth information for the local area as an aggregate depth map of the plurality of depth maps assigned for the plurality of segments.

16. The method of claim 12, wherein the at least one portion of the first depth information is associated with at least one segment of the plurality of segments, and the at least one portion of the second depth information is associated with one or more segments of the plurality of segments.

17. The method of claim 12, wherein:

first capture intervals of the plurality of capture intervals are associated with a first subset of the gates, each local storage location of the first subset of gates stores first image data during a respective first capture interval, the first image data based on portions of an illumination pattern emitted at a first phase of a plurality of phases and reflected from the local area;

second capture intervals of the plurality of capture intervals following the first capture intervals are associated with a second subset of the gates, each local storage location of the second subset of gates stores second image data during a respective second capture interval, the second image data based on portions of the illumination pattern emitted at a second of the phases and reflected from the local area; and third capture intervals of the plurality of capture intervals following the second capture intervals are associated with a third subset of the gates, each local storage location of the third subset of gates stores third image data during a respective third capture interval, the third image data based on portions of the illumination pattern emitted at a third of the phases and reflected from the local area, and the method further comprising determining the depth information using at least one of the first image data, the second image data and the third image data.

18. The method of claim 17, further comprising:

collecting the TOF information using the first image data, the second image data or the third image data, and collecting the SL information using the first image data, the second image data and the third image data.

19. A headset comprising:

a display configured to emit image light;

a camera assembly comprising:

a projector configured to emit, into a local area, a structured light (SL) pattern at a plurality of phases, a sensor including a plurality of pixels, each pixel having a plurality of gates with a plurality of local storage locations, an exposure interval of each pixel divided into a plurality of capture intervals associated with the gates, each local storage location storing image data during a respective capture interval of the plurality of capture intervals, the image data based on portions of the SL pattern emitted at a respective phase of the plurality of phases and
reflected from the local area, and
a controller configured to:
determine first depth information for the local area based on time-of-flight (TOF) information collected using the image data stored during a first subset of the capture intervals,
determine second depth information for the local area based on SL information collected using the image data stored during a second subset of the capture intervals, and
determine depth information for a plurality of segments of the local area using at least one portion of the first depth information and at least one portion of the second depth information; and
an optical assembly configured to direct the image light to an eye-box of the headset corresponding to a location of a user's eye, the image light comprising the determined depth information.

20. The headset of claim 19, wherein the controller is further configured to:
assign, for each segment, a respective portion of the first depth information or a respective portion of the second depth information to be a respective depth map of a plurality of depth maps for each segment; and
generate the depth information for the local area as an aggregate depth map of the plurality of depth maps assigned for the plurality of segments.

* * * * *